United States Patent
Zhang et al.

(10) Patent No.: US 12,258,668 B2
(45) Date of Patent: Mar. 25, 2025

(54) METHOD FOR FABRICATING AN AROMATIC POLYMER AND A POLYMER FABRICATED ACCORDING THERETO

(71) Applicant: City University of Hong Kong, Kowloon (HK)

(72) Inventors: Qichun Zhang, Ma On Shan (HK); Xiang Wang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 18/337,743

(22) Filed: Jun. 20, 2023

(65) Prior Publication Data
US 2025/0003085 A1 Jan. 2, 2025

(51) Int. Cl.
  C25B 3/03    (2021.01)
  C08G 61/10   (2006.01)
  C25B 3/29    (2021.01)

(52) U.S. Cl.
  CPC .............. C25B 3/03 (2021.01); C08G 61/10 (2013.01); C25B 3/29 (2021.01)

(58) Field of Classification Search
None
See application file for complete search history.

(56) References Cited

U.S. PATENT DOCUMENTS

| | | | | |
|---|---|---|---|---|
| 4,863,574 A | * | 9/1989 | Maurice | H01M 4/60 252/500 |
| 2014/0257002 A1 | * | 9/2014 | Wang | C25B 3/23 205/342 |
| 2022/0127736 A1 | * | 4/2022 | Fontecave | C25B 3/03 |

OTHER PUBLICATIONS

Famarque et al. (Makromol. Chem., Rapid Cornmun. 4, 455-457 '1983') (Year: 1983).*
Guo et al. (J. Mater. Chem. C, 2015, 3, 8490--8494) (Year: 2015).*
Zhao ("Handbook for Chemical Process Research and Development", Second Edition CRC Press, Mar. 21, 2023) (Year: 2023).*
Peres et al. (Synthetic Metals 118 '2001' 65-70). (Year: 2001).*
Utley et al. (J. Mater. Chem., 2002, 12, 1613-1624). (Year: 2002).*
Gewu Lu, et al., Electrochemical polymerization of pyrene in the electrolyte of boron trifluoride diethyl etherate containing trifluoroacetic acid and polyethylene glycol oligomer, Journal of Electroanalytical Chemistry 586 (2006) 154-160.
Gaoquan Shi, et al., Layered poly(naphthalene) films prepared by electrochemical polymerization, Polymer Bulletin 33, 325-329 (1994).

(Continued)

*Primary Examiner* — Wojciech Haske
(74) *Attorney, Agent, or Firm* — Renner, Kenner, Greive, Bobak, Taylor & Weber

(57) ABSTRACT

A method for fabricating a chemical composition containing an aromatic polymer, including the steps of: providing an anodic region and a cathodic region; providing an arene precursor; providing an electrochemical potential between the anodic region and the cathodic region; reacting the arene precursor via the electrochemical potential to form the composition, which further includes the step of conducting a cathodic reaction. A chemical composition containing an aromatic polymer prepared according to the method.

27 Claims, 27 Drawing Sheets

Benzene or PAHs skeleton     Halogens (i.e., Br and I)

(56) References Cited

OTHER PUBLICATIONS

Ali Abdulkarim, et al., A New Solution to an Old Problem: Synthesis of Unsubstituted Poly(para-phenylene), J. Am. Chem. Soc. 2016, 138, 16208-16211.
Armido Studer and Dennis P. Curran, The electron is a catalyst, Nature Chemistry, vol. 6, Sep. 2014, 765-773.
Anton Wiebe, et al., Electrifying Organic Synthesis, Angew. Chem. Int. Ed. 2018, 57, 5594-5619.
Wen Zhang, et al., Electrochemically driven cross-electrophile coupling of alkyl halides, Nature, vol. 604, Apr. 14, 2022, 292-297.
Xiang Wang, et al., Recent advances on electrochemical methods in fabricating two-dimensional organic-ligand-containing frameworks, Smart Mat. 2021; 2:299-325.
Cheng Zhang, et al., Overview of electric-field-induced deposition technology in fabricating organic thin films, J. Mater. Chem. C, 2021, 9, 374-394.

\* cited by examiner

METHOD FOR FABRICATING AN AROMATIC POLYMER AND A POLYMER FABRICATED ACCORDING THERETO

TECHNICAL FIELD

The present invention generally relates to a method for fabricating an aromatic polymer. In particular, the invention relates to a method for fabricating an aromatic polymer from an arene precursor via an electrochemical approach. The invention also relates to a polymer formed according to said method.

BACKGROUND

Polymeric compounds have a wide range of industrial uses, for instance, in optoelectrical applications especially with conjugated species, owing to their desirable physical and chemical properties. Polymers are formed from monomers as basic units bonded to one another, commonly via carbon-carbon (C—C) coupling reactions in the process of polymerization.

Conventional synthetic methods, such as the Ullmann reaction and the Suzuki reaction, have been employed to fabricate polymers. However, these methods usually require high pressures, high temperatures or metallic/organometallic catalysts, which imply higher costs in terms of materials and production setup, among other issues.

Electrochemical methods are being used for polymeric compound fabrication due to their proved properties such as relatively easy to set up, environmentally-friendly and controllable. However, existing electrochemical methods mostly rely on anodic oxidation and/or metallic/organometallic catalysts to form polymers. Such anodic polymerization are usually prone to overoxidation and poor position selectivity. On the other hand, the cathodic coupling reaction is rarely investigated and studies disclosed from limited sources are either not related to polymers or still involve undesirable metallic/organometallic catalysts. The use of metallic/organometallic catalysts is incompatible with electrochemical methods as it may induce undesired deposition onto electrode surfaces.

Therefore, there still remains challenges to directly-fabricate high-quality polymer films. In addition, there remains a need to employ cathodic polymerization to form larger and/or multilayer polymer films under mild and metallic catalyst-free conditions, in a controllable manner while being adapted to enable versatile setups (e.g. selection of electrodes and solvents) based on needs.

SUMMARY OF THE INVENTION

An aspect of the present invention relates to a method for fabricating a chemical composition containing an aromatic polymer, including the steps of: providing an anodic region and a cathodic region; providing an arene precursor; providing an electrochemical potential between the anodic region and the cathodic region; reacting the arene precursor via the electrochemical potential to form the composition, which further includes the step of conducting a cathodic reaction Another aspect of the present invention relates to a chemical composition containing an aromatic polymer prepared according to the method of the present invention.

Without intending to be bound by theory, it is believed that the present invention may provide a novel process for fabricating a chemical composition containing an aromatic polymer which may be of an improved quality, with beneficial properties such as a controllable dimension (e.g. thickness) or shape, as well as a continuous and smooth surface.

BRIEF DESCRIPTION OF THE DRAWINGS

FIG. 7b illustrates a graph showing the roughness along the white dash line in f FIG. 7a;

FIG. 7c illustrates a 3D image of the PPP(I) thin film in FIG. 7a;

FIG. 10c illustrates a graph showing the roughness along the white dash line in FIG. 10a;

DETAILED DESCRIPTION OF THE INVENTION

Figure 1:
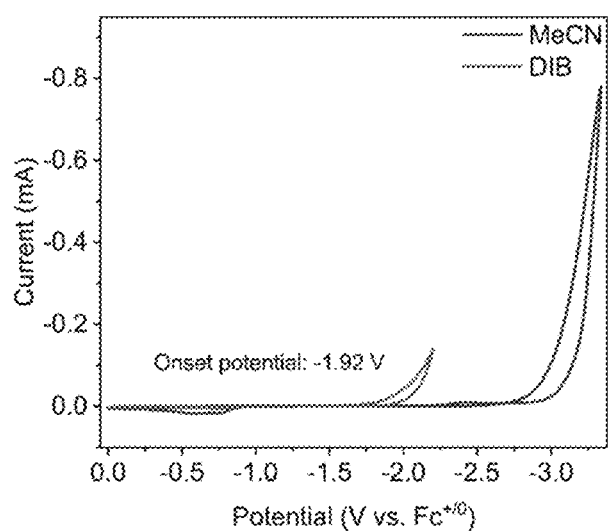
FIG. 1 illustrates an embodiment of the present invention with cyclic voltammetry of 1,4-diiodobenzene in acetonitrile (MeCN) solution containing 0.1 M tetrabutylammonium hexafluorophosphate (TBAPF$_6$) at the scanning rate of 50 mV/s and the onset potential is −1.92 V.
Figure 2A:
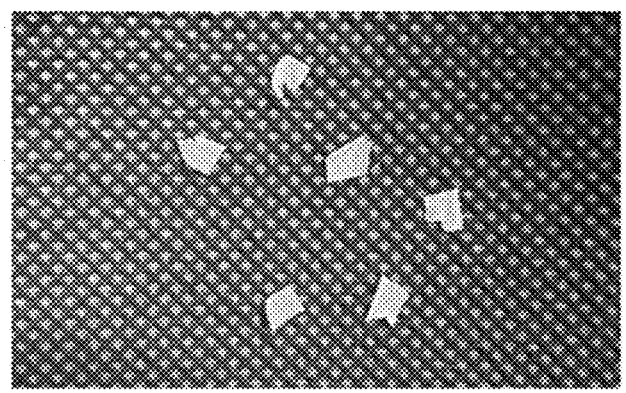
FIG. 2a illustrates cut up pieces of an embodiment of the present invention prepared as poly(p-phenylene) PPP(I) thin films.
Figure 2B:
FIG. 2b illustrates an embodiment of the present invention with PPP(I) thin film immersed in different organic solvents under white light.
Figure 2C:
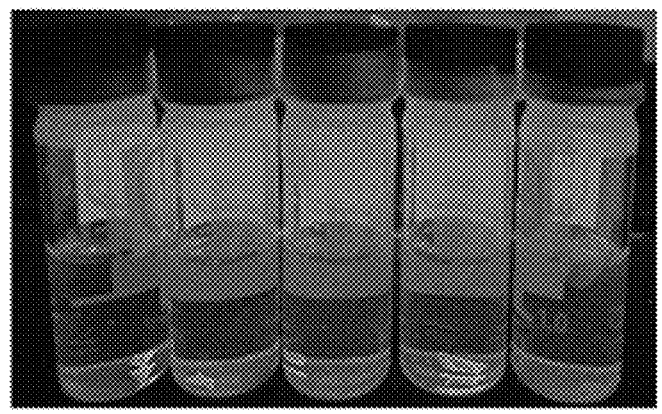
FIG. 2c illustrates an embodiment of the PPP(I) thin film of the present invention immersed in different organic solvents under 365 nm light, showing from left to right tetrahydrofuran (THF), toluene, dimethylformamide (DMF), acetone, and chloroform.
Figure 2D:
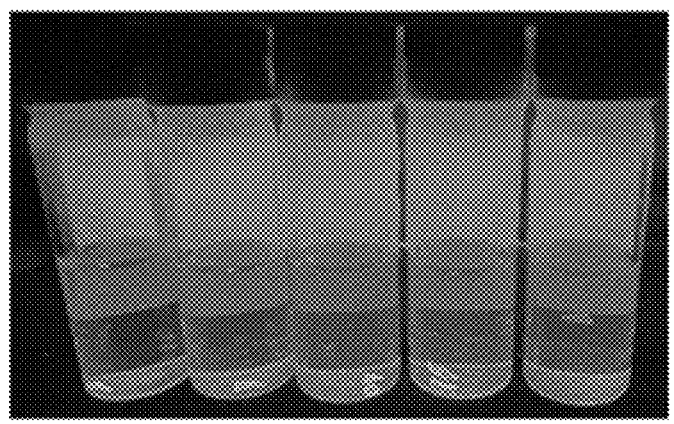
FIG. 2d illustrates an embodiment of the PPP(I) thin film of the present invention immersed in different organic solvents after 4 months under 365 nm light, showing from left to right THF, toluene, DMF, acetone, and chloroform.

Unless otherwise specifically provided, all tests herein are conducted at standard conditions which include a room and testing temperature of 25° C., sea level (1 atm.) pressure, pH 7, and all measurements are made in metric units. Furthermore, all percentages, ratios, etc. herein are by weight, unless specifically indicated otherwise. It is understood that unless otherwise specifically noted, the materials compounds, chemicals, etc. described herein are typically commodity items and/or industry-standard items available from a variety of suppliers worldwide.

The following preparations and examples are given to enable those skilled in the art to more clearly understand and to practice the present invention. They should not be considered as limiting the scope of the invention, but merely as being illustrative and for representing preferred embodiments thereof.

Unless otherwise defined, all technical terms used herein have the same meaning as commonly understood by one skilled in the art to which the invention belongs.

As used herein, "arene" refers to an aromatic hydrocarbon containing one or more benzene ring. It includes monocyclic aromatic hydrocarbons (MAHs) and polycyclic aromatic hydrocarbons (PAHs). It includes unsubstituted aromatic hydrocarbons and those aromatic hydrocarbons with one or more hydrogen at the benzene ring being substituted by e.g. other compounds, functional groups or elements.

As used herein, "comprising" means including the following elements but not excluding others. "Consisting of" means that the material solely consists of, i.e. is formed by the respective element.

As used herein, "catalyst" refers to a material or a compound that can initiate a chemical reaction or increase the rate of a chemical reaction in its presence. In the context herein, electrons can be interpreted as catalysts on some occasions. For instance, in some redox reactions or radical reactions, a catalytic cycle may be initiated by an electron. As an exogenous electron enters the cycle to catalyze the reaction, it is possible that the (an) electron may leave at the end of the cycle or the electron may continue to participate in another cycle. It is obvious to those skilled in the art that the electron as described in different steps of the catalytic cycle is not unnecessary the same electron, but is intended to emphasize electronic transfer processes occurred within a reaction or a chain of reactions. On some other occasions, electrons only act as carriers instead of catalysts in certain reactions, e.g. where other catalysts (e.g. transition metals or organometals) present and the electrons only serve as carriers in the reactions, while some embodiments of the present invention dispense with catalysts except electrons to initiate polymerization of precursors to form polymers.

As used herein, "cathodic reaction" means a reduction reaction that accepts one or more electrons donated from a cathode. In a typical setup of electrolysis or electropolymerization, a cathodic reaction takes place at a cathode or in a cathodic region.

As used herein, "Mild and neutral conditions" refers to moderate conditions for reactions, that are in contrast with those conditions considered to be more vigorous, such as high temperatures and high pressures. In particular, the term herein refers to one or more reaction condition selected from the group: room temperature or a temperature from about 0° C. to about 60° C., atmosphere pressure, no additives, no metal catalysts, neutral pH (i.e. not acidity or basicity) and combination thereof.

As used herein, "precursor" refers to a compound or a material (or a group of compounds or materials) that participates in chemical reactions to produce one or more other compound. In the case of forming a polymer, a precursor may be a monomer which forms the basic structural unit of the polymer.

An aspect of the present invention relates to a method for fabricating a chemical composition containing an aromatic polymer, including the steps of: providing an anodic region and a cathodic region; providing an arene precursor; providing an electrochemical potential between the anodic region and the cathodic region; reacting the arene precursor via the electrochemical potential to form the composition. The reacting step further includes conducting a cathodic reaction.

Without intending to be limited by theory, it is believed that the electrochemical reduction method herein can overcome one or more of the above-mentioned problems, due to the fact that electrons always accumulate on the cathode. It is believed that this can protect the electrode especially those made of active metals. Also, it is believed that by tuning reaction conditions, the process herein may directly fabricate high-quality aromatic thin films on substrates.

In one embodiment of the present invention, the cathodic reaction may include the step of conducting a dehalogenation coupling reaction of the arene precursor to form the composition.

In some embodiments of the present invention, in a reaction, particularly in a cathodic reaction, electrons can be used as catalysts for reacting the arene precursor to form the composition. In this way, the reaction makes use of electrons as catalysts and dispenses with the use of additional catalysts that can have certain drawbacks. For instance, some conventional methods using metallic or organometallic catalysts can be expensive, cause pollution or induce undesired deposition onto the surface of an electrode. In the reaction, electrons can directly serve as the catalyst to induce the coupling reaction. In other words, electrons serve as the main or sole catalyst for catalysis of coupling reactions in the course of polymerization In one embodiment of the present invention, the method includes the step of providing an anodic electrode at the anodic region, a cathodic electrode at the cathodic region; and a solution containing an electrolyte. The anodic electrode and the cathodic electrode are at least partially contacting the solution.

In one embodiment of the present invention, the polymer is a conjugated polymer. The polymerization through electrochemical dehalogenation leads to extended π-conjugated chains.

For instance, the polymer can be in form of film. In some cases, the polymers can be an unsubstituted conjugated polymer. The as-obtained unsubstituted conjugated polymer films possess a relatively good continuity and smooth surface. The polymer may be a homocyclic aromatic polymer. In some other cases, the polymer may be a heterocyclic polymer.

In one embodiment of the present invention, the polymer takes a form selected from the group of a dimeric form, an oligomeric form, a polymeric form, and a combination thereof.

Suitable precursors, for example, arenes, can be used in the method described by the embodiments of the present invention to generate polymers with desired properties. In some cases, one or more hydrogens on an arene may be substituted by other functional substitution groups. Certain functional substitution groups may be suitable when they are able to facilitate reactions of polymer fabrication or end products' quality. For instance, functional substitution groups can be halogens, amines, halo compounds. Preferably, functional substitution groups may be halogens. Halide groups can make molecules active under electrochemical process. It is believed that a C—C coupling reaction very likely, if not always, takes place at the halogen-substituted positions on the precursors, thus the halogen substitution facilitates fabrication of polymers. Example halogens can be fluorine, chlorine, bromine or iodine. More preferably, functional substitution groups may be bromine or iodine. In a preferred embodiment, functional substitution groups may be iodine. Without intending to be limited by theory, it is believed that the iodine on an iodine-substituted arene, e.g. compared with bromine, has a larger atomic radius which results in a longer covalent bond between the iodine and the carbon which the iodine bonds to. Therefore, the absolute value of reductive onset potential of an iodine-substituted arene is generally lower than its bromine-substituted counterpart, and it therefore requires a shorter time to form the resulting polymer film. For instance, reductive onset potential of 1,4-diiodobenzene is lower than that of 1,4-dibromobenzene. In another preferred embodiment, functional substitution groups may be bromine. In industrial production, it may be more difficult to prepare iodine-substituted compounds than their bromine-substituted counterparts, which are more versatile and thus pragmatically advantageous, despite their less but still acceptable electrochemical reactivities with respect to iodine-compounds.

In some cases, arenes used in the method may be selected from the group of benzene; naphthalene; biphenyl (bibenzene); anthracene; phenanthrene; phenalene pyrene; diphenylbenzene (terphenyl); naphthacene (i.e. tetracene), triphenylene, chrysene, benzo[c]phenanthrene, benz[a]anthracene, triphenylbenzene, and a combination thereof. It is possible to select other arenes, especially those polycyclic aromatic hydrocarbons with more benzene rings.

In one embodiment of the present invention, the arene precursor is selected from the group of a phenyl halide, a halogenated polycyclic aromatic hydrocarbon, and a combination thereof. The arene precursor includes more than one halogen. In other words, the arene precursor may be multi-halogenated instead of mono-halogenated. For instance, the arene precursor may be dihalogenated, trihalogenated, tetrahalogenated, or other cases of multi-halogenations.

In one embodiment of the present invention, the halogen is selected from the group of a fluorine, a chlorine, a bromine or an iodine, and a combination thereof, preferably, the halogen includes a bromine or an iodine. In one embodiment of the present invention, the arene precursor may be a dihaloarene. The arene precursor may be selected from the group of dihalobenzene, dihalonaphthalene, dihalobiphenyl, dihaloanthracene, dihalophenanthrene, dihalophenalene, dihalopyrene, diphenylbenzene, dihalonaphthacene (i.e. dihalotetracene), dihalotriphenylene, dihalochrysene, dihalobenzo[c]phenanthrene, dihalobenz[a]anthracene, and a combination thereof; or the arene precursor is selected from the group of dihalobenzene, dihalonaphthalene, dihaloanthracene, dihalophenanthrene, dihalopyrene, and a combination thereof.

In one embodiment of the present invention, the polymer may be a covalent organic framework (COF). The COF may be two-dimensional (2D). The arene precursor of the polymer may be a trisubstituted arene. In some cases, the trisubstituted arene may be a 1,3,5-trisubstituted benzene or a 1,3,5-tris(4-substituted-phenyl)benzene, for instance, a 1,3,5-trihalobenzene or 1,3,5-tris(4-halophenyl)benzene. In some cases, the arene precursor may be a 1,3,5-tribromobenzene or 1,3,5-tris(4-bromophenyl)benzene.

In one embodiment of the present invention, the arene precursor may be a trihaloarene. Optionally, the arene precursor is selected from the group of 1,3,5-trihalobenzene, 1,3,5-tris(4-halophenyl)benzene and a combination thereof.

In one embodiment of the present invention, the arene precursor may be a tetrahaloarene. Optionally, the arene precursor includes a 1,3,6,8-tetrahalopyrene.

In some embodiments of the present invention, the arene precursor may include a mixture of different arenes such that the polymer as formed is a heteropolymer.

In one embodiment of the present invention, the arene precursor includes at least two different precursors. For instance, the precursor includes at least two different disubstituted arene, for instance, dihaloarenes. Hence the composition fabricated contains at least two types of polymers having different arene groups. This allows heterogeneous coupling reactions to take place among the different arene precursors. In this way, the polymers as fabricated having different arene groups may be able to exhibit desired or specific optic or electric properties depending on application context, that are different to the properties of the polymer films made from homogeneous coupling reactions involving a single type of precursor. Besides, the methods in some embodiments of the present invention may be applied to heterogeneous coupling reaction to form polymer films, bringing about similar benefits as the cases of using a single type of precursor, when comparing it with conventional methods for heterogenous coupling reactions, e.g. those that require high temperatures, harsh pressures, or addition of noble organometallic catalysts.

In one embodiment of the present invention, the arene precursor may include at least two different trisubstituted arenes. Hence the composition fabricated contains at least two types of polymers having different arene groups, particularly with approximately three inter-monomer bonds on each monomer. In one embodiment of the present invention, the precursor may include at least one trisubstituted arene and at least one disubstituted arene. For instance, the precursor may include a trihaloarene and a dihaloarene. In this way, in addition to the above mentioned differences on properties compared with the cases of using a single type of precursor, it is beneficial for pore size control using different arenes together as the precursors.

In an embodiment of the present invention, the precursor may be an unsubstituted precursor. That means, for instance, the precursor is an arene composed of substantially a monocyclic or polycyclic aromatic structure, without any functional group that substitutes for one or more hydrogens on the aromatic structure. In another preferred embodiment of the present invention, the precursor may be a substituted precursor with one or more functional groups which will not remain in the end polymer products. In other words, the one or more substituting functional group exists in the precursor and may then be removed in the process of reaction to fabricate the polymer, and thus may not be contained in the polymer as fabricated via the reaction. In addition, in the embodiments of the present invention, the polymer as fabricated may not contain undesired side chains. Conventional fabrication approaches (e.g. usually conducted with high temperatures, harsh pressures, or addition of noble organometallic catalysts) result in polymers normally having long side chains, that may adversely alter their intrinsic properties through changes in charge density of backbones, stacking modes and solid-state morphologies. Such changes may have a significant effect on their performance in their applications such as optical/electronic devices. In contrast, polymers fabricated from the embodiments of the present invention dispense with undesired side chains.

In some embodiments of the present invention, the precursor may be a multi-substituted precursor, for instance, the above-discussed disubstituted, trisubstituted arenes or other feasible arenes. In one embodiment of the present invention, the arene precursor is a dihaloarene. The arene precursor includes a first halogen and a second halogen. The second halogen is located on the precursor substantially opposite the first halogen. A first dehalogenation reaction takes place at the first halogen and a second dehalogenation reaction takes place at the second halogen. In the case of dihalobenzene, the dehalogenations may take place at meta-positions or para-positions. In the case of dihalo-PAHs, the second dehalogenation may take place at the substantially opposite side with respect to the site where the first dehalogenation takes place. For instance, in the case of naphthalene, the first dehalogenation may take place at the 1 position and the second dehalogenation may take place at the 4 or 5 position of naphthalene. In the case of anthracene, the first and second dehalogenations may respectively take place at the 9 and 10 positions of anthracene or take place at the 2 and 6 positions of anthracene. For PAHs, the meaning of the term "substantially opposite" may not only includes the cases of "right opposite" such as 1,4-substituted (i.e. para-) benzene, 9,10-substituted anthracene, etc., but also includes the cases of "diagonally opposite", such as 1,3-substituted (i.e. meta-) benzene, 2,6-substituted anthracene, 1,5-substituted naphthalene, etc. It is desirable to use halogenated precursors for C—C coupling reaction via an electrochemical potential due to the merit of excellent selectivity, in which the coupling reaction preferably takes place at halogen-substituted positions.

In one embodiment of the present invention, the arene precursor maybe a dihaloarene or a trihaloarene where the two or three halogens substitute respective hydrogens at positions of the same precursor so that their distance(s) between each other are the greatest. The distance between the halogens may be counted with reference to numbering systems for arenes (e.g. the IUPAC numbering system), in which each carbon position of an arene is numbered. The distance between the halogens may be counted by number of carbons between the carbon positions on the arene where the halogens are located in a clockwise/anti-clockwise manner. For instance, in the case of dihalonaphthalene, the distance between the two halogens are the greatest when they are respectively located at 1 and 5 position of naphthalene, such that there are four carbons between the positions where the two halogens are located in clockwise or anticlockwise direction. This is beneficial for an increase reaction rate as such arrangement reduces steric hindrance during polymerization.

In one embodiment of the present invention, the step of reacting the arene precursor via the electrochemical potential to form the composition further includes the step of forming the arene precursor into a halogenated radical as an intermediate to further form the chemical composition. In the case of a dihaloarene as the precursor, the halogenated radical may be a mono-halogenated radical. In the case of a trihaloarene, the halogenated radica may be a dihalogenated radical.

As discussed herein, some embodiments of the present invention includes the step of reacting an arene precursor to fabricate aromatic polymers by dehalogenated carbon-carbon (C—C) coupling reactions via an electrochemical potential. Using a disubstituted arene as an example, the reaction can be symbolized as X—Ar—X being the precursor and (—Ar—)$_n$ being polymers as the end products. n can be any positive integers, preferably 3 or above. "Ar" as used herein refers to any arenes used in the embodiments of the present invention to form their respective polymers. As used herein, "X" refers to a functional group substituting one or more hydrogen of the arenes. For instance, "X" refers to a halogen, preferably, a bromine or an iodine. The dot "·" used herein with an element or a compound represents the element or compound in its radical form, which means that the element or compound contains at least one unpaired electron. For instance, "X·" and "Ar·" respectively refer to the radical forms of a functional group (e.g. a halogen) and a precursor (or a monomer). Likewise, "X—Ar·", "X—Ar—Ar·" and "X—(Ar)$_n$·" represent a mono-halogenated precursor, or a mono-halogenated polymer in its dimeric, oligomeric or polymeric form, with a halogen at one end and an unpaired electron at the other end of the polymer chain (thus they may be called a mono-halogenated radical). The symbol "⁻" refers to a negative charge bound to a compound or an element after receipt of an electron. For instance, "X⁻" refers to a halogen with a negative charge. "X—Ar—X⁻", "X—Ar—Ar—X⁻" and "X—(Ar)$_n$—X⁻" refer to a dihalogenated precursor (or a monomer) or a dihalogenated polymer in its dimeric, oligomeric or polymeric form, carrying a negative charge. In the midst of reaction from precursors to desired polymers, it is possible to have some intermediates with double negative charges, such as "X⁻—Ar—X⁻", "X⁻—Ar—Ar—X⁻" and "X⁻—(—Ar—)$_n$—X⁻", although they are less common. It should be appreciated that those halogenated precursors and halogenated polymers (i.e. immediate polymers) may continue to react in the catalytic cycle to form longer polymer chains as the reactions go on.

Figure 19:
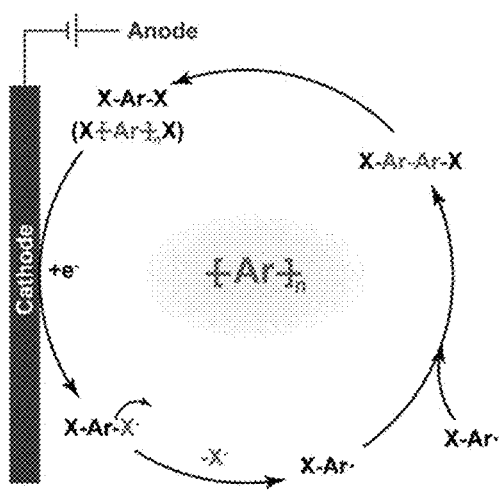
FIG. 19 illustrates a possible mechanism of an embodiment of polymerization of the present invention via electrochemical dehalogenation.
Figure 20:
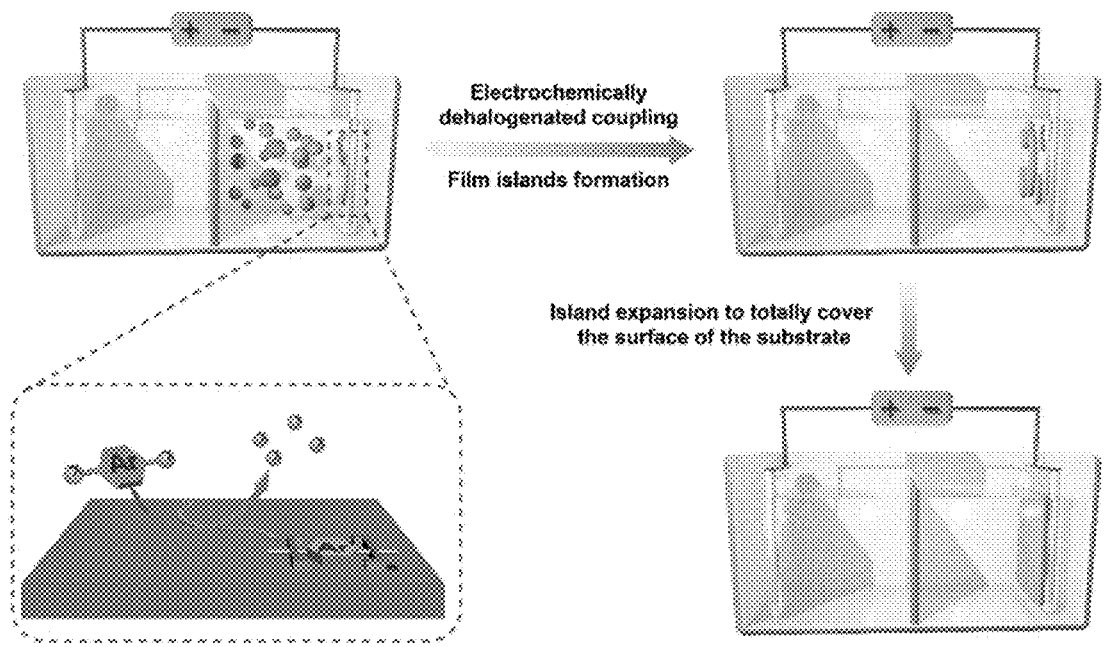
FIG. 20 illustrates a schematic diagram of the proposed strategy according to an embodiment of the present invention, in which the as-prepared polymer may deposit on the surface of a cathode to produce a smooth film.

In a possible mechanism of the reactions, as shown in FIG. 19, upon application of an electrochemical potential, the precursors and immediate polymers adsorb on the cathode and an electron transfers from the cathode to the adsorbed precursors or immediate polymers, which results in the formation of active intermediates such as "X—Ar—X⁻", "X—Ar—Ar—X⁻" and "X—(—Ar—)$_n$—X⁻", "—X—Ar—X⁻", "—X—Ar—Ar—X⁻" and "—X—(—Ar—)$_n$—X⁻", also known as negatively charged dihalogenated arenes. Subsequently, the bond between the carbon of the arene and the halide (i.e. C—X bond) in the intermediates breaks to generate X—Ar· (and/or also X—Ar—Ar·, X—(—Ar—)$_n$—Ar·) and X⁻. In other terms, the negatively charged active intermediate may be formed before the cleavage of the halogenated compound into a radical, unlike other known mechanisms in which the halogenated compound probably breaks into cleavage immediately upon receipt of an electron. After that, two same or different molecules selected from the group of X—Ar·, X—Ar—Ar· and X—(—Ar—)$_n$—Ar· undergo C—C coupling reaction to form a longer dihalogenated polymer. In some cases, two X—Ar·, which are the same, undergo C—C coupling reaction to form X—Ar—Ar—X. In some other cases, X—Ar· and X—Ar—Ar·, which are different by their lengths, undergo C—C coupling reaction to form X—Ar—Ar—Ar—X. In some cases, the above generated X—Ar—Ar—X repeats the above steps to react with another X—Ar—X, to eventually form the conjugated polymer, which deposits on the surface of the electrode (the cathode). It is advantageous to use the methods in the embodiments of the present invention for polymer film fabrication, as the methods herein may realize streamlined "one-stop" fabrication where during the process, it may realize both the C—C coupling reaction and polymer film fabrication. On the other hand, some convention methods additionally require further film processing after polymer synthesis such as spin coating, casting, etc. Without intending to be limited by theory, it is believed that the methods as described in the embodiments of the present invention may allow direct fabrication of polymer film on substrates (e.g. electrodes as substrates, add-on substrates during the reaction, or substrates that the fabricated polymer film to be transferred to), without any other post-polymerization processing to form a film. In other words, the product (i.e. the chemical composition containing an aromatic polymer) of the methods may already be a polymer thin film formed on substrate surfaces upon polymerization. By adjustments of reaction parameters, a polymer thin film with desired size, shape and properties can be obtained.

In one embodiment of the present invention, the step of providing the arene precursor further includes the step of adding the arene precursor into the cathodic region. The cathodic region is separate from the anodic region. The above feature, for instance, may be implemented by setting up a divided cell where the cathodic and anodic regions are separated into compartments in the cell, both containing the electrolyte solution. The cathodic electrode and anodic electrode may be respectively immersed into the electrolyte solution in the cathodic and anodic regions. The two electrodes are connected by an external circuit from which the electrochemical potential is applied. There may be provided a semipermeable membrane between the anodic and cathodic regions, which allows controlled diffusion of certain molecules to pass through the membrane from one compartment to the other or vice versa. The membrane may be, for example, a polymeric membrane, such as polyethylene glycol (PEG) polymer, perfluorosulfonic acid (PFSA) polymer or Polytetrafluoroethylene (PTFE). A glass sand core filter may also be used as a separator between the anodic region and the cathodic region.

In some embodiments of the present invention, the method includes the step of fabricating the composition on a surface of the cathodic electrode in form of film. In particular, the step of reacting the arene precursor via the electrochemical potential to form the chemical composition further includes the step of simultaneously polymerizing the arene precursor to form the chemical composition and forming a film of the chemical composition on a surface of the cathodic electrode. Compared with conventional methods which require additional film formation processes after polymerization, simultaneous polymerization and film fabrication proposed by the embodiments of the present invention are thus important and highly desirable.

One of the advantages of using the methods described in the embodiments of the present invention is it may enable precise control of the thickness of the as-prepared polymer film. For instance, the precise control may be achieved by controlling certain reaction parameters. The thickness mainly depends on synthesis processes and equipment. The equipment shape and size may have some effects on the thickness of the thin film. According to the studies of the inventors, thickness of the as-prepared thin film may be linearly related to the reaction time under constant current.

The thickness of a polymer film may have a dimension in the range from nanoscale to microscale. For instance, the thickness of a polymer film can reach up to from about 2 nm to about 2 μm. This metallic/organometallic-catalyst-free strategy may prevent the undesired deposition of metal/organometal onto the surface of cathode, thereby ensuring the purity of the as-prepared thin films. The method may be used to fabricate large-area thin films as well as multilayer heterostructures for wide applications in organic optoelectronic devices. In one embodiment of the present invention, the electrolyte is selected from the group of: hexafluorophosphates, tetrafluoroborates, ammonium bromides, perchlorate including but not limited to tetramethylammonium hexafluorophosphate (TMAPF$_6$), tetraethylammonium hexafluorophosphate (TEAPF$_6$), tetrabutylammonium hexafluorophosphate (TBAPF$_6$), potassium hexafluorophosphate (KPF$_6$), tetramethylammonium tetrafluoroborates (TMABF$_4$), tetraethylammonium tetrafluoroborates (TEABF$_4$), tetrabutylammonium tetrafluoroborates (TBABF$_4$), potassium tetrafluoroborates (KBF$_4$), lithium perchlorate (LiClO$_4$), and a combination thereof.

In one embodiment of the present invention, the solution contains a solvent. For instance, the solvent contains an anhydrous organic solvent; optionally, the solvent is selected from the group of: acetone, acetonitrile, toluene, dichloromethane, chloroform, tetrahydrofuran, dimethylformamide, dimethyl sulfoxide, benzonitrile, and a combination thereof. In some cases, the solvent contains more than one solvent, e.g. two solvents or more. For instance, the solvent contains acetonitrile and one or more other solvent. In one example, the solvent contains acetonitrile and toluene. More preferably, the amount of acetonitrile is more than that of the other solvent(s). In the case of the solvent containing acetonitrile and toluene, the ratio (v/v) of the acetonitrile and toluene may be from about 8:1 to about 2:1. In particular, the ratio of acetonitrile to toluene is about 4:1. The thin film fabrication to some extent depends on the solubility of the precursors. Using a solution containing mixed solvents (i.e. containing more than one solvent) can solve the problem of poor solubility of some precursors. In an appropriate electrochemical window, ratio among solvents does not affect C—C bond formation and polymer film preparation. However, containing more ratio of acetonitrile (e.g. about 8:1 to about 2:1 compared with all other solvents; e.g. about 4:1 compared with all other solvents) can provide good conductivity during the polymerization, which can shorten the reaction time.

In one embodiment of the present invention, the dehalogenation coupling reaction may be conducted under a constant voltage from about 1.5V to about 3.5V for from about 2 hours to about 36 hours at a temperature of from about 0° C. to about 60° C., or from about 10° C. to about 35° C. In particular, the voltage may be about 2.3V, about 2.5V, about 2.6V, about 2.8V or about 3.0V The electrolyte includes tetrabutylammonium hexafluorophosphate at a concentration of from about 0.05 mmol/mL to about 1 mmol/mL. In particular, the electrolyte concentration may be about 0.1 mmol/mL. The arene precursor concentration may be from about 0.001 mmol/mL to about 0.5 mmol/mL. In particular, the precursor concentration maybe about 0.004, about 0.006, about 0.008, about 0.06, about 0.01, about 0.02, about 0.04 or about 0.2 mmol/mL.

In one embodiment of the present invention, the method further includes, after the step of reacting the arene precursor to form the chemical composition the step of adding a quenching agent for quenching the reaction; optionally, the quenching agent is selected from the group of: water, a salt solution and the solvent and a combination thereof.

In one embodiment of the present invention, the reacting the arene precursor to form the composition may be conducted under the room temperature; under a current density of about 0.5 mA to about 5 mA, for from about 0.5 hours to about 20 hours. The lower current may provide more condensed thin film, but it may require longer reaction time, and vice versa. In one embodiment of the present invention, the method further includes, after the step of reacting the arene precursor to form the chemical composition the step of reversing positive and negative poles of the electrochemical potential for quenching of the reactions. This can neutralize accumulative electrons within each double layer to quench the reaction.

In some embodiments of the present invention, the step of reacting the arene precursor to form the chemical composition may take place in various pH conditions, for instance, in neutral conditions, in alkaline conditions or in slightly acidic conditions. For instance, the reaction may take place in a range of pH value from about 4 to about 14, or from about 5 to about 14, or from about 6 to about 14, or from about 7 to about 14, or from about 7 to about 13. Although in the foregoing description, it mentions it is a benefit of the embodiments of the method of the present invention to conduct the reaction successfully under mild and neutral conditions, such as under a neutral pH condition, compared with other conventional methods, it would be appreciated that the reaction may also be conducted and workable in other pH conditions, e.g. those pH values mentioned above. Preferably, the reaction may take place in alkaline conditions, which may benefit the reaction of the arene precursor to form the chemical composition.

In one embodiment of the present invention, the method further includes, after the step of reacting the arene precursor to form the chemical composition the step of washing the composition with a washing agent selected from the group of water, ethanol, methanol, n-hexane, 2-dichlorobenzene, dichloromethane, 1,2-dichloroethane, tetrahydrofuran, heptane, ethyl acetate, toluene, acetonitrile, and a combination thereof.

In one embodiment of the present invention, the method further includes, after the step of reacting the arene precursor to form the chemical composition the step of drying the chemical composition at a drying temperature of from about room temperature to about 250° C., or from about room temperature to about 70° C., or from about 70° C. to about 150° C.; or from about 80° C. to about 100° C.; optionally where the drying step takes places under vacuum for a period of from about 1 hour to about 12 hours; or from about 1 hour to about 6 hours; or from about 1 hour to about 4 hours; or from about 6 hours to about 12 hours; or from about 8 hours to about 12 hours. It is obvious to those skilled in the art to select an appropriate time range depend on the types and parameters (e.g. thickness) of polymer films to be dried.

In one embodiment of the present invention, the anodic electrode includes a conductive substrate; preferably where the substrate includes an inert conductive metal selected from the group of platinum, titanium, an alloy thereof, and a combination thereof. The anodic electrode as chosen may provide enough voltage for initiation of reaction without dissolving in the solution or depositing on the cathode, in contrast to some active metals, which form cations and dissolve in the solution due to their lower oxidative potentials. Also, the active metals could deposit on the cathode via reduction under cathodic bias, which causes impurity to the polymer film, that requires additional processes to remove such deposited metals from the film.

In one embodiment of the present invention, the cathodic electrode includes a conductive substrate. The cathodic electrode may be selected from the group of silicon, nickel, gold, platinum, stainless steel, an alloy thereof, and a combination thereof. For instance, the cathodic electrode may include silicon.

One embodiment of the present invention relates to a polymer fabricated according to the method described in the embodiments of the present invention.

General Experimental Conditions

All reactions were conducted under nitrogen atmosphere unless otherwise noted. Toluene, dichloromethane (DCM), and ethanol (EtOH) were purchased from Anaqua Global International Inc. Ltd, of Hong Kong, China, http://www.anaquahk.com/ at ACS grade. 3 Å molecular sieves were purchased from Shanghai Aladdin Bio-Chem Technology Co., Ltd., of Shanghai, China, https://www.aladdin-e.com/zh_cn/, activated under at 300° C. in vacuum oven for 3 hours and stored in glove box. Anhydrous acetonitrile (MeCN) and dimethylsulfoxide (DMSO) were purchased from J&K Scientific Ltd., of Beijing, China, https://www.jk-chemical.com/ and dried over the post-activated 3 Å molecular sieves in glove box for at least 24 hours prior to use. The toluene was dried by heating over sodium with benzophenone as an indicator and stored with addition of 10% m/v post-activated 3 Å molecular sieves in glove box for at least 24 hours prior to use. The electrolyte tetrabutylammonium hexafluorophosphate (TBAPF$_6$) was purchased from J&K Scientific Ltd., (above), recrystallized from EtOH three times, dried in a vacuum oven at 70° C. for 24 hours, and stored in glove box. All substrates were purchased from TCI (Shanghai) Development Co., Ltd., of Shanghai, China, https://www.tcichemicals.com/HK/en/ and directly used without further purification unless otherwise noted.

Fourier-transform infrared spectroscopy (FTIR) spectra were obtained on PerkinElmer Spectrum II, from Perkin Elmer Co., of Waltham, Massachusetts, United States, https://www.perkinelmer.com. UV-vis spectroscopy was performed on UH4150 UV-VIS-NIR Spectrophotometer from Hitachi High-Tech Corporation of Tokyo, Japan, https://www.hitachi-hightech.com. Fluorescent spectroscopy was performed on FluoroMax-4 from Horiba ltd. Raman spectra were taken with WITec alpha300 R Raman System. Scanning electron microscopy (SEM) was conducted on Quattro S Environmental SEM from Thermo Fisher Scientific Inc. of Waltham, Massachusetts, United States, https://www.thermofisher.com. Atomic force microscopy (AFM) was performed using MultiMode 8-HR from Bruker Corporation of Billerica, Massachusetts, the United States, https://www.bruker.com/.

Cyclic voltammetry data were measured on CH Instruments 760E from CH Instruments, Inc. of Austin, Texas, the United States. A three-electrode electrochemical cell, from Gaossunion (Tianjin) Optoelectronics Technology Co., Ltd. of Wuhan, China, http://www.gaossunion.com/, includes a gold disk of 3 mm diameter as working electrode, a quasi-reference electrode Ag/AgNO$_3$ containing 0.1 M AgNO$_3$ as a reference, 0.1 M TBAPF$_6$ in acetonitrile as an electrolyte, and a platinum (Pt) wire as counter electrode (37 mm×0.5 mm). The gold disk electrode was polished with a series of aluminum oxide powder (1.0 m, 0.3 m, and 50 nm), Tianjin Aida Hengsheng Technology Development Co. Ltd. from Tianjin, China, http://www.tjaida.cn/, cleaned with distilled water and acetonitrile, and dried over with dry nitrogen prior to use. The reference electrodes were calibrated against the voltage of ferrocene (1 mM) before and after each set of cyclic voltammetry scans. All measurements were carried out at a scan rate of 50 mV/s in pure MeCN solution or MeCN/toluene (v/v=8:2) mixture, or DMSO containing 0.1 M TBAPF$_6$ as the supporting electrolyte. Reactions were conducted in two-electrode cells under DC Power Supply R4G series from Matsusada Precision Inc. of Shiga, Japan, https://www.matsusada.com/ using Pt plate (18×12×0.2 mm, 99.9% purity, purchased from Taobao.com) as an anode and conductive substrates including silicon, gold, stainless steel, nickel, and Pt (18×12 mm) as cathodes.

Results and Discussion

Figure 5A:
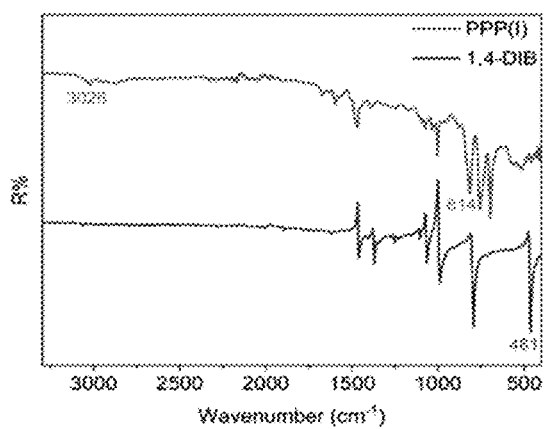
FIG. 5a illustrates an embodiment of the FTIR spectra of the as-prepared PPP(I) thin film of the present invention and its corresponding 1,4-diiodobenzene precursor.
Figure 5B:
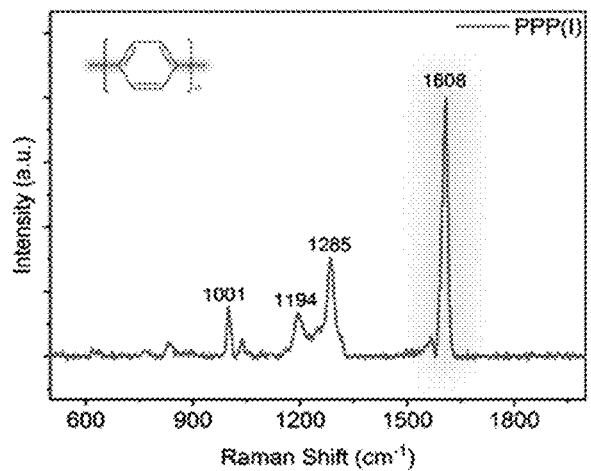
FIG. 5b illustrates a Raman spectrum of an embodiment of the as-prepared PPP(I) thin film of the present invention.
Figure 5C:
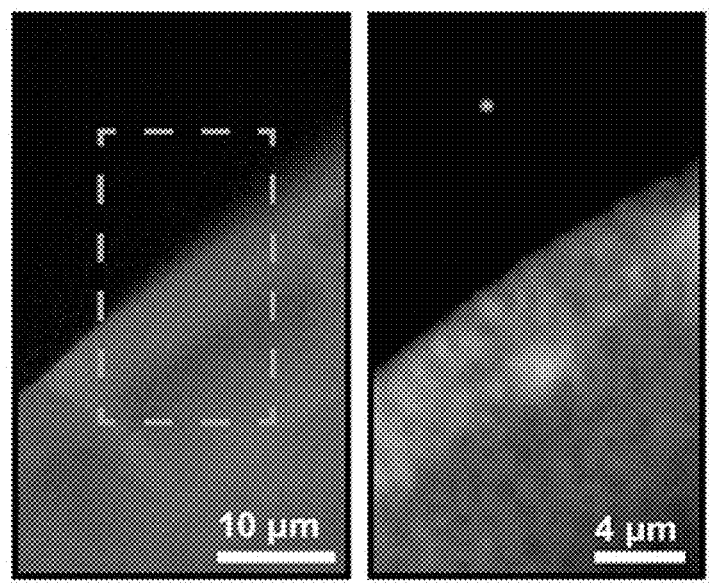
FIG. 5c illustrates a photograph of an embodiment of the as-prepared PPP(I) thin film of the present invention (left) and the corresponding Raman mapping (right) of the area circled by yellow dash lines.

To probe the possibility of electrochemically-dehalogenated carbon-carbon coupling reactions among halogen-substituted benzene/PAHs, 1,4-diiodobenzene was firstly employed, we use 1,4-diiodobenzene as an example to conduct polymerization for the fabrication of poly(p-phenylene) (PPP(I)) thin films at various planar cathodes under mild and neutral conditions. Before polymerization, the cyclic voltammetry (CV) of 1,4-diiodobenzene is conducted to investigate its onset potential, which determines the applied potential window for the polymerization (Figure. 1). Based on the CV curve, the onset potential of 1,4-diiodobenzene is around −1.92 V vs. a ferrocenium/ferrocene (Fc+/Fc) reference. During the CV scanning process, light brown-color near the surface of the cathode can be observed, indicating that I-C bonds could be broken to form byproduct I$_2$. The as-prepared thin film is characterized by Fourier-transform infrared spectroscopy (FTIR) where several finger peaks (~814 and 3026 cm$^{-1}$) of PPP (FIG. 5a) have been found. Compared with 1,4-diiodobenzene monomers, the original vibration peak of the C—I band (located at 461 cm$^{-1}$) disappears and the characteristic peak of out-of-plane C—H bending vibration appears at 814 cm$^{-1}$, suggesting the broken of C—I bond and the formation of the para-substituted phenylene moiety. Moreover, the vibration of sp2 hybridized C—H on the aromatic rings is identified by the peak at 3026 cm$^{-1}$, which is the finger peak of the PPP(I) structure. Other two bands located at 756 cm$^{-1}$ and 698 cm$^{-1}$ contribute from the terminal mono-substituted phenyl rings and the ring pucker. Additionally, Raman spectroscopy further proves the formation of the as-prepared PPP thin film (FIG. 5b). Three peaks (1194, 1285, and 1608 cm$^{-1}$) in Raman spectroscopy are main characteristic bands of PPP, which is consistent with the previously-reported results. The peak at 1001 cm$^{-1}$ is ascribed to the in-phase stretching of terminal phenyl rings. The continuity of the as-prepared PPP thin film is verified by Raman images (FIG. 5c) because the film displays the homogenous intensity in the Raman signal.

Figure 5D:
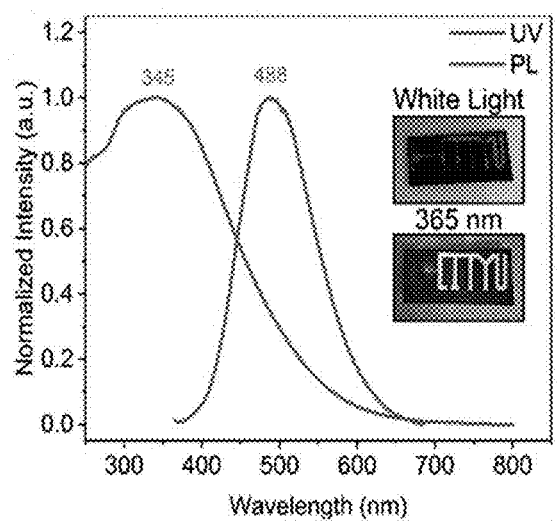
FIG. 5d illustrates the UV-Vis absorption (red, i.e. left) and fluorescent spectra (blue, i.e. right) of an embodiment of the as-prepared PPP(I) thin film of the present invention ($\lambda_{ex}$=350 nm); Inserts show photographs of embodiments of the as-prepared PPP(I) thin film patterns of the present invention under white light and 365 nm light.

Films have been studied using the UV-Vis and fluorescent spectroscopies. The maximum absorption of PPP films locates at ~345 nm while the precursor 1,4-diiodobenzene does not have such UV absorption in the same range (FIG. 5d). The strong fluorescence at 488 nm further confirms the formation of PPP (FIG. 5d). In addition, the as-prepared PPP(I) thin film shows excellent chemical stability and insolubility in many organic solvents including tetrahydrofuran, toluene, dimethylformamide, acetone, and chloroform (FIG. 2).

Figure 3A:
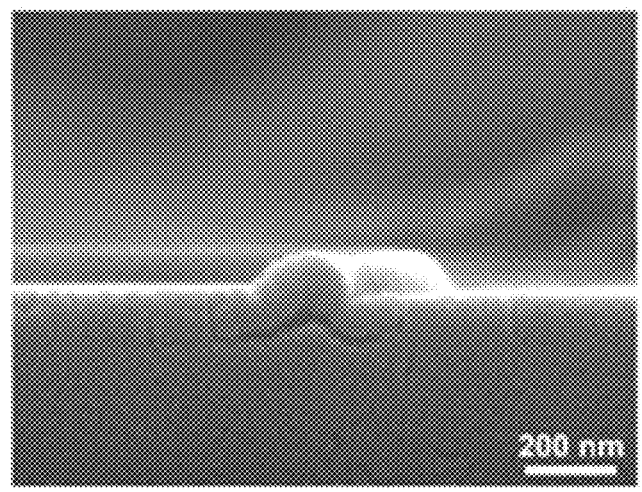
FIG. 3a illustrates a scanning electron microscope (SEM) image of an embodiment of the cross-section of the as-prepared PPP(I) thin film of the present invention with a reaction time of 1 hour.
Figure 3B:
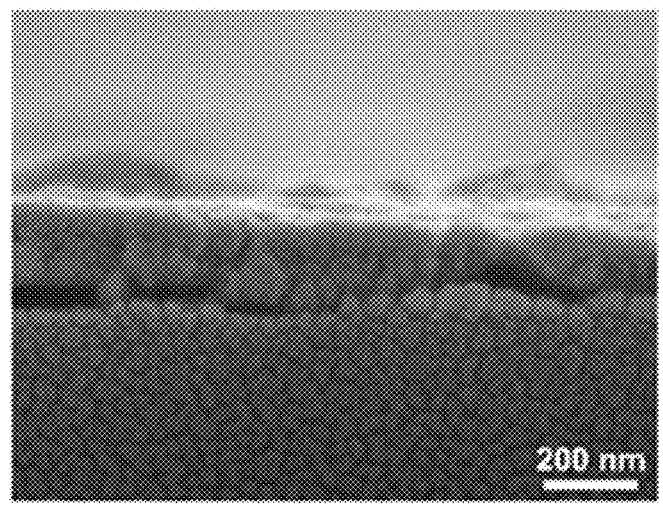
FIG. 3b illustrates another SEM image of an embodiment of the cross-section of the as-prepared PPP(I) thin film of the present invention with a reaction time of 1.5 hours.
Figure 3C:
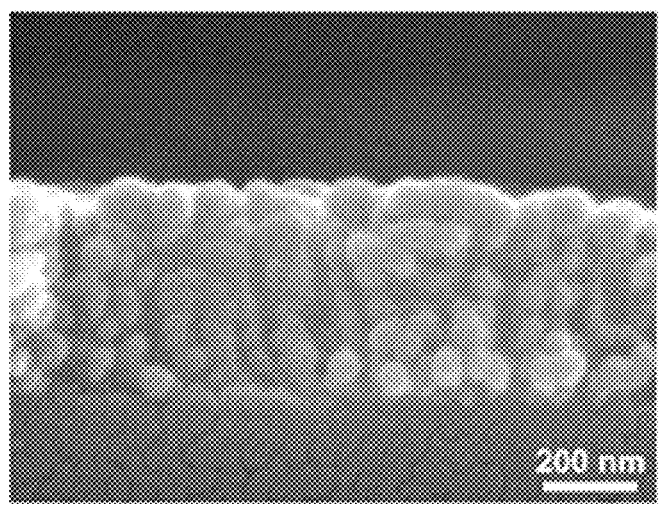
FIG. 3c illustrates another SEM image of an embodiment of the cross-section of the as-prepared PPP(I) thin film of the present invention with a reaction time of 3 hours.
Figure 3D:
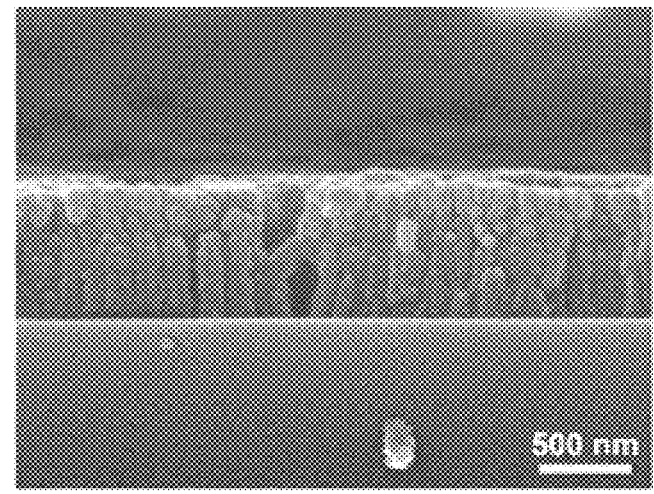
FIG. 3d illustrates another SEM image of an embodiment of the cross-section of the as-prepared PPP(I) thin film of the present invention with a reaction time of 5 hours.
Figure 3E:
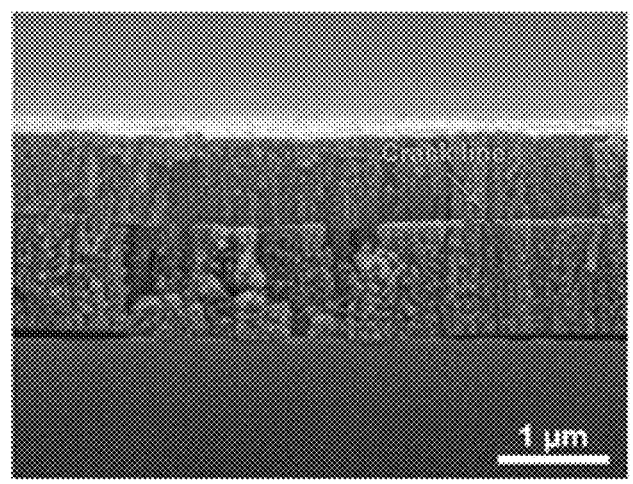
FIG. 3e illustrates another SEM image of an embodiment of the cross-section of the as-prepared PPP(I) thin film of the present invention with a reaction time of 12 hours.
Figure 3F:
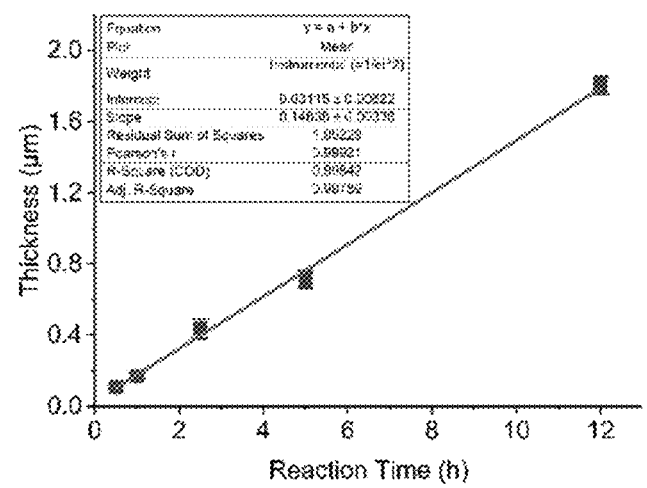
FIG. 3f illustrates the linear relationship between an embodiment of the thickness of as-prepared PPP(I) thin film of the present invention and the reaction time.
Figure 4A:
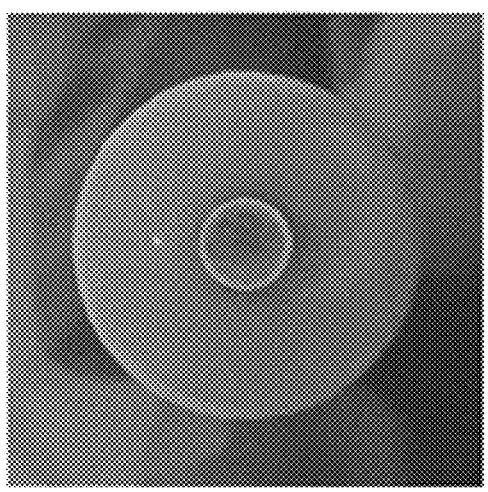
FIG. 4a illustrates an embodiment of the PPP(I) film of the present invention formed on an Au electrode with a diameter of 3 mm.
Figure 4B:
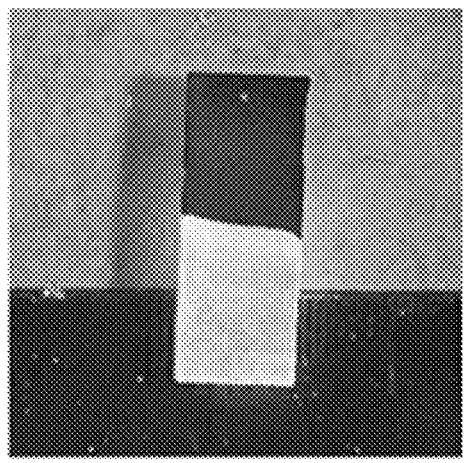
FIG. 4b illustrates an embodiment of the PPP(I) film of the present invention formed on a Si substrate.
Figure 4C:
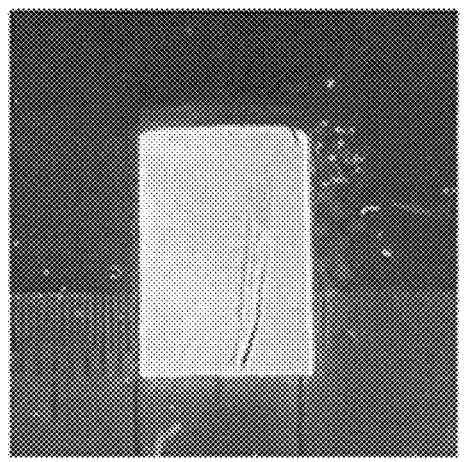
FIG. 4c illustrates an embodiment of the PPP(I) film of the present invention formed on another Si substrate with a different size.
Figure 4D:
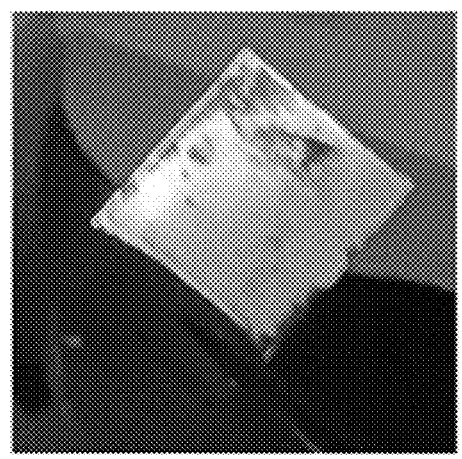
FIG. 4d illustrates an embodiment of the PPP(I) film of the present invention formed on a stainless steel.
Figure 4E:
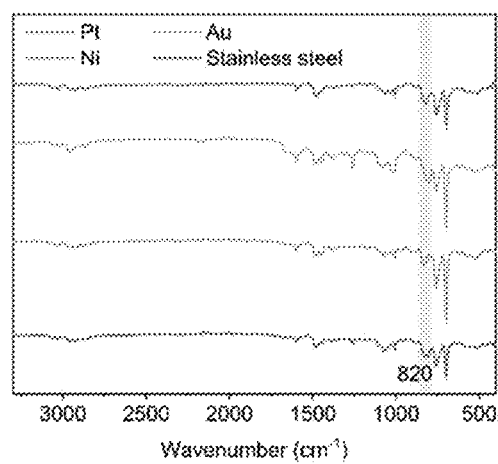
FIG. 4e illustrates FTIR spectra of some embodiments of PPP(I) films of the present invention fabricated with different cathodic substrates, i.e. Pt, Au, Ni, stainless steel from top to bottom.
Figure 6A:
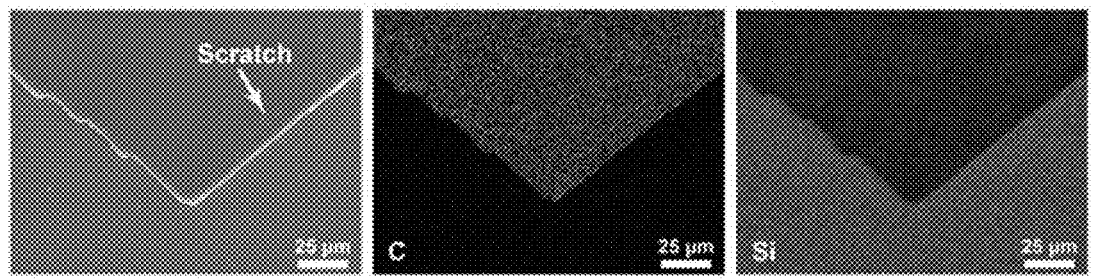
FIG. 6a illustrates SEM images of an embodiment of the top-view of the PPP(I) thin film of the present invention after the polymerization of 5 hours, as well as the corresponding mapping images of elements C (middle) and Si (right)
Figure 6B:
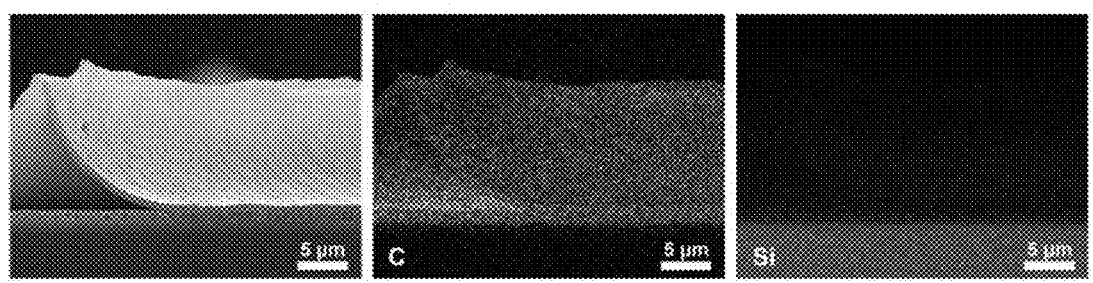
FIG. 6b illustrates a cross-sectional view of an embodiment of the PPP(I) thin film of the present invention after the polymerization of 12 hours, as well as the corresponding mapping images of elements C (middle) and Si (right)
Figure 7A:
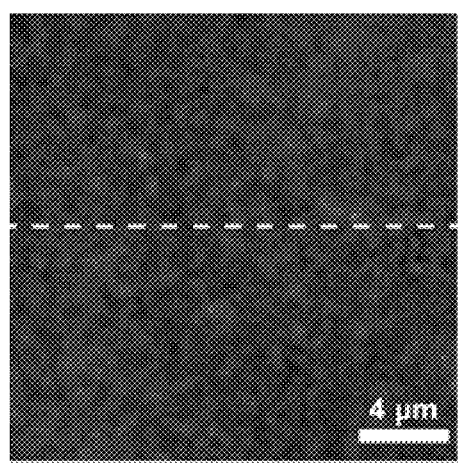
FIG. 7a illustrates an atomic force microscopy (AFM) height image of an embodiment of the PPP(I) thin film of the present invention after a reaction of 5 hours.
Figure 7B:
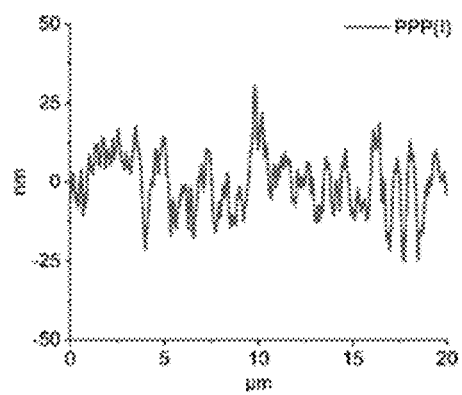
Figure 7C:
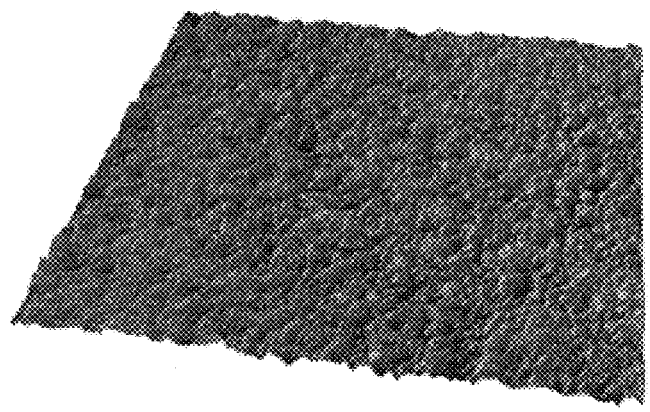

Another merit of this electrochemically dehalogenative polymerization is that the thickness of the as-prepared film can be easily controlled through tuning the reaction parameters (e.g., the applied voltage, current, reaction time, electrolyte viscosity). Herein, we primarily investigate the relationship between the thickness and the reaction time at a current density of 1 mA cm$^{-2}$ (FIG. 3). With silicon cathode as an example, the thickness of the PPP(I) film linearly increased with prolonging the reaction time (FIG. 3f), and the theoretical minimum thickness of the PPP(I) film can reach up to e.g. ~30 nm. However, when the reaction time is prolonged over 5 hours, the PPP(I) thin film likely reached its maximum thickness because of the appearance of horizontal crack lines and the dislocation between the top-layered and bottom-layered films (FIG. 3d and FIG. 3e). Besides, the thickness of the bottom-layered PPP(I) thin film (measured from the crack line to the substrate) is quite close to the film fabricated in FIG. 3d. The SEM images reveal that the as-prepared thin film shows continuous and compact morphology compared with the PPP thin films prepared by other methods. The corresponding EDX mappings also suggest that the film uniformly grew on the substrate (FIGS. 6a and 6b). Additionally, the smooth surface of the as-prepared PPP(I) thin film was also characterized by atomic force microscopy (AFM), where the root mean square roughness Rq is only 11.9 nm (FIGS. 7a and 7b).

Without intending to be limited by theory, it is believed that electrochemical deposition strategy could allow the PPP(I) thin film to be directly fabricated in different sizes and shapes through facilely pre-patterning the conductive substrates under the same condition (FIG. 4 and FIG. 5d). Remarkably, in contrast to the anodically oxidative strategy, which always suffers from the drawbacks of substrate limitation (for example, most of active metals are not suitable as electrodes due to their lower oxidative potentials), the electrons accumulated on the cathode make the metal electrode possess a significant negative potential, protecting metal electrodes from the oxidation to form soluble cations. This makes the film fabrication of conjugated polymers on various metal substrates possible. As mentioned, the coupling reaction occurs under the cathodic bias, therefore, the polymerization still takes place after changing the platinum anode into other sacrificial anodes (i.e. iron and zinc). Surprisingly, solvents do not significantly affect the electrochemically-dehalogenated C—C coupling reaction since the formation of new C—C bonds among aromatic monomers can be achieved in various solvents including MeCN, DMF, DMSO, and particularly MeCN/toluene mixture (Table 1). Other conditions are summarized in Table 1. Additionally, due to the additive- and catalyst-free strategy, the preparation of PPP films on different conductive substrates is feasible, however, the necessary optimization of reaction conditions is required (FIG. 4).

Other Conditions of the Polymerization:

TABLE 1

Deviation from the standard conditions

| Entry | Deviation from the standard conditions | Work or Not (Y/N) |
|---|---|---|
| 1 | Standard conditions | Y |
| 2 | No 1,4-diiodobenzene | N |
| 3 | Iodobenzene instead of 1,4-diiodobenzene | N |
| 4 | Addition of 3 equivalent of DIPEA or TEA | Y[a] |
| 5 | 0.25M of TBAPF$_6$ | Y |
| 6 | 0.1M of TBABF$_4$, TEABF$_4$, or KPF$_6$ instead of TBAPF$_6$ | Y |
| 7 | DMF or DMSO instead of MeCN | Y[b] |
| 8 | MeCN/Toluene (v/v 8:2) | Y |
| 9 | MeCN/Toluene (v/v 1:1) | Y[c] |
| 10 | Zn or Fe anode instead of Pt | Y |
| 11 | Pt, Au, Ni, or stainless-steel cathode instead of Si | Y |
| 12 | Cu cathode instead of Si | N |
| 13 | Constant voltage: E$_{cell}$ = 1.8 V | N |
| 14 | Constant voltage: E$_{cell}$ = 3.5 V | Y[d] |
| 15 | Constant current | Y[e] |

[a]The addition of TEA or DIPEA may improve the reaction rate.
[b]Different solvents bearing wide electrochemical windows may not affect the formation of the polymer film but the reaction times are different (i.e., 3 hours and 8 hours for DMF and DMSO, respectively).
[c]High ratio of toluene system may significantly decrease the conductivity, in which longer time are needed for the polymerization.
[d]High voltage may not affect the polymerization but cannot get continuous films on the cathode.
[e]The voltage was in the range of 2~2.8 V. Continuous film may not be obtained under high constant current.

Figure 8A:
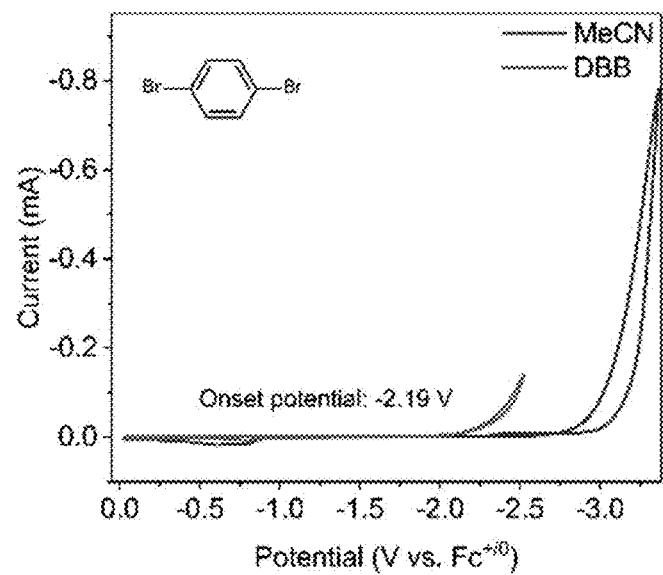
FIG. 8a illustrates a cyclic voltammetry graph of an embodiment of 1,4-dibromobenzene in MeCN solution containing 0.1 M $TBAPF_6$.
Figure 8B:
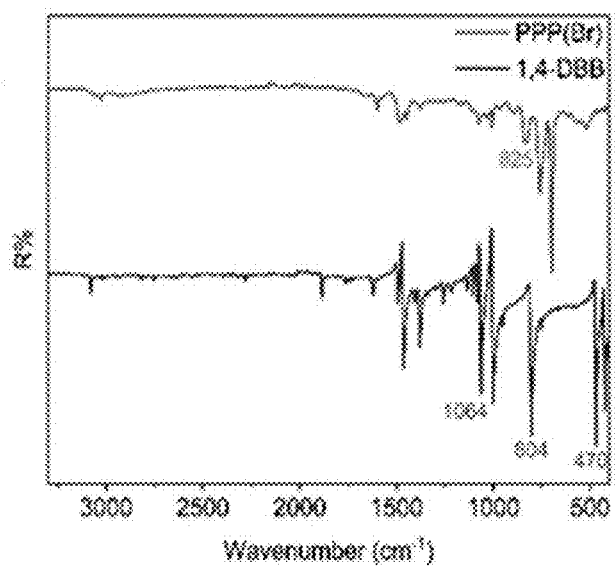
FIG. 8b shows a FTIR spectra of an embodiment of the as-prepared PPP (Br) thin film of the present invention and its corresponding 1,4-dibromobenzene precursor.
Figure 8C:
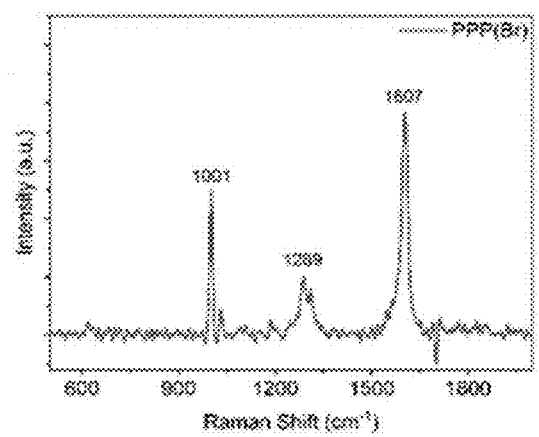
FIG. 8c illustrates a Raman spectrum of an embodiment of the as-prepared PPP(Br) thin film of the present invention.
Figure 9A:
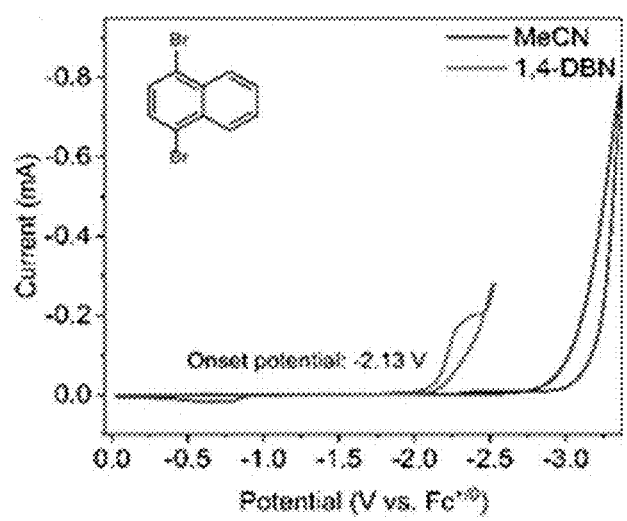
FIG. 9a illustrates a cyclic voltammetry graph of an embodiment of 1,4-dibromonaphthalene in MeCN solution containing 0.1 M $TBAPF_6$ at the scanning rate of 50 mV/s.
Figure 9B:
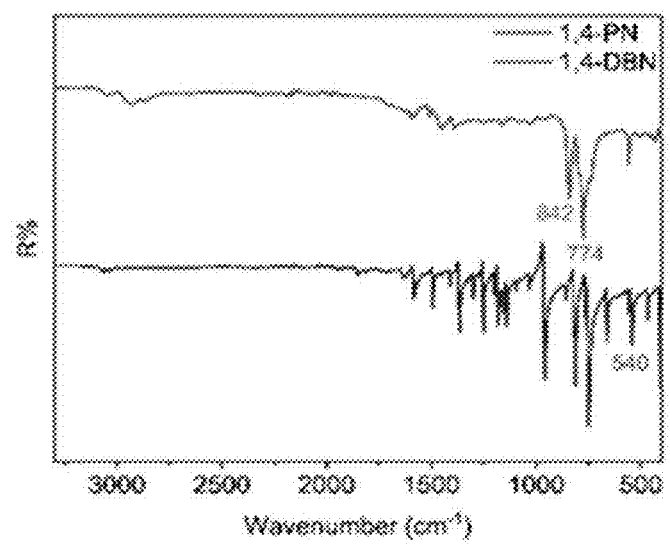
FIG. 9b illustrates FTIR spectra of an embodiment of the as-prepared 1,4-polynaphthalene (1,4-PN) thin film of the present invention and its corresponding 1,4-dibromonaphthalene precursor.
Figure 9C:
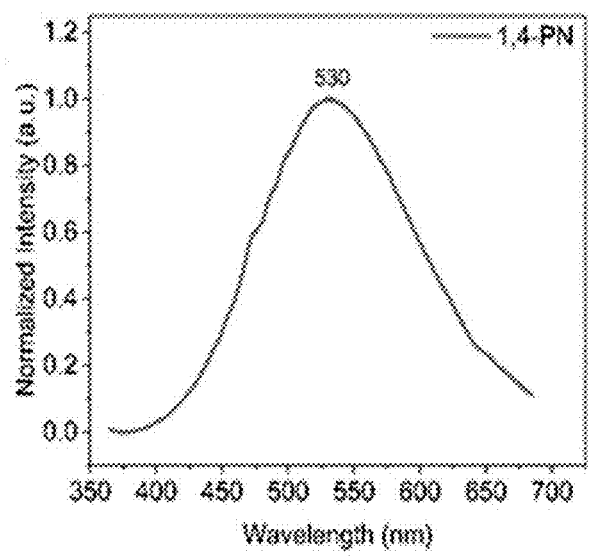
FIG. 9c illustrates a fluorescent spectrum of an embodiment of the as-prepared 1,4-PN thin film of the present invention.
Figure 10A:
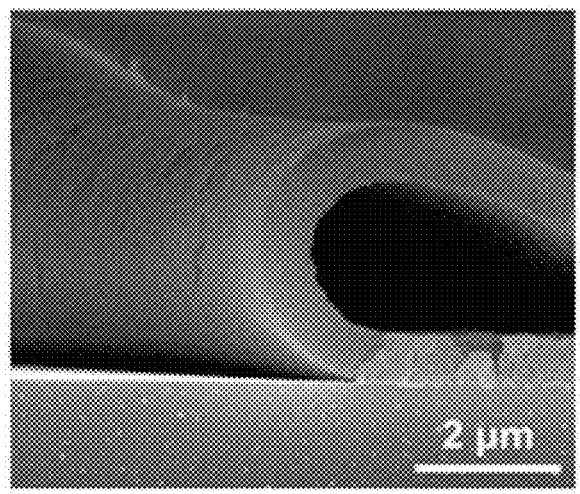
FIG. 10a illustrates a SEM image of an embodiment of the as-prepared 1,4-PN thin film herein.
Figure 10B:
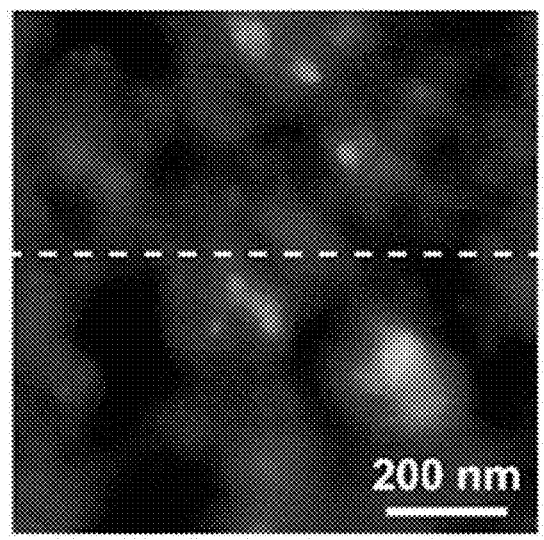
FIG. 10b illustrates an AMF image of the surface of an embodiment of the as-prepared 1,4-PN thin film of the present invention.
Figure 10C:
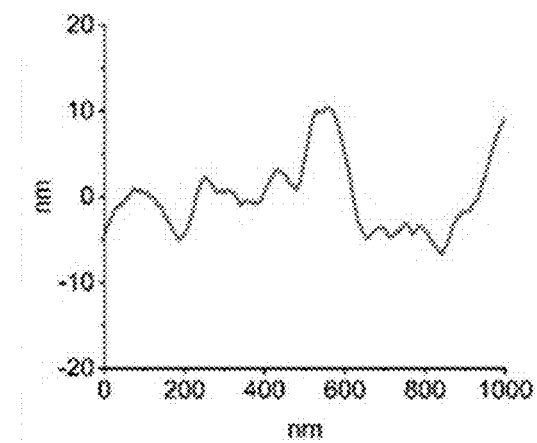
Figure 11A:
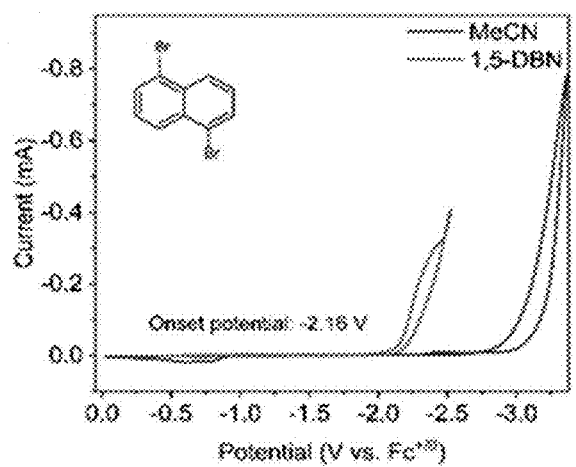
FIG. 11a illustrates a cyclic voltammetry graph of an embodiment of the 1,5-dibromonaphthalene of the present invention in MeCN solution containing 0.1 M $TBAPF_6$ at the scanning rate of 50 mV/s.

The successful polymerization of 1,4-diiodobenzene through electrochemical dehalogenation strongly inspires us to extend our research scope to other halogen-substituted aromatic compounds (FIGS. 18a-18j). As one of typical bromine-substituted benzenes, 1,4-dibromobenzene (1,4-DBB) was selected as the precursor, which could be successfully polymerized to form corresponding films under similar conditions except prolonging the reaction time (FIGS. 8a-8c). One should note that due to the higher bond energy of Ar—Br comparing to that of Ar—I, bromine-substituted aromatic compounds often require more negative reductive potential. Furthermore, a series of halogen-substituted PAHs (i.e., 1,4-dibromonaphthalene (1,4-DBN) (FIGS. 9a-9c and FIGS. 10a-10c), 1,5-dibromonaphthalene (1,5-DBN) (FIGS. 11a-11b), 9,10-dibromoanthracene (9,10-DBA) (FIGS. 12a-12b), 2,6-dibromoanthracene (2,6-DBA) (FIGS. 13a-13b), 2,7-dibromophenanthrene (2,7-DBP) (FIGS. 14a-14b), and 2,7-dibromopyrene (2,7-DBPy) (FIGS. 15a-15b)), and the precursors of two-dimensional (2D) covalent organic frameworks (COFs) (i.e., 1,3,5-tribromobenzene (TBB) (FIGS. 16a-16d) and 1,3,5-tris(4-bromophenyl)benzene) (TBPB) (FIGS. 17a-17d) have been successfully polymerized through electrochemically-dehalogenated C—C coupling reactions. Notably, slightly basic conditions (i.e., addition of triethylamine or N,N-diisopropylethylamine) can significantly enhance the reaction rate without sacrificing the quality of the as-prepared films. However, few positive results can be obtained from chlorine- and fluorine-substituted aromatic compounds probably due to the higher bond energy of Ar—Cl and Ar—F. After polymerization, all films have been characterized by various spectra and exhibited finger peaks: PPP(Br) (FTIR: ~820 cm$^{-1}$; Raman: 1001, 1289, and 1607 cm$^{-1}$), poly(1,4-naphthalene) (1,4-PN) (FTIR: 842 and 774 cm$^{-1}$), poly(1,5-naphthalene) (1,5-PN) (FTIR: 795 and 775 cm$^{-1}$); poly(9,10-anthracene) (9,10-PA) (FTIR: 746 and disappearance of 880 cm$^{-1}$), poly(2,6-anthracene) (2,6-PA) (FTIR: 885 and 802 cm$^{-1}$), poly(2,7-phenanthrene) (2,7-PPA) (FTIR: 888, 810, and 740 cm$^{-1}$), poly(2,7-pyrene) (2,7-PPy) (FTIR: 879 and 818 cm$^{-1}$), 1,3,5-polybenzene (PTBB) (FTIR: ~887, 756, and 698 cm$^{-1}$; Raman: 1001, 1300, and 1602 cm$^{-1}$), and poly(1,3,5-triphenylbenzene) (PTBPB) (FTIR: 881 and 820 cm$^{-1}$; Raman: 1001, 1346, and 1608 cm$^{-1}$). Also, the UV-vis absorptions of all films have been conducted as shown in FIGS. 18b-18j: the maximum absorptions locate at 328 nm for PPP(Br), 355 nm for 1,4-PN, 320 nm for 1,5-PN, 391 nm for 9,10-PA, 296 nm for 2,6-PA, 330 nm for 2,7-PPA, 385 nm for 2,7-PPy, 293 nm for PTBB, and 322 nm for PTBPB film, respectively. It is worthy to point out that although larger conjugated degree can stabilize the aromatic moiety and significantly reduce the potential required for the coupling reaction, it is not absolute due to the fact that some sites substituted by halogens might be relatively-less active ones (Table 2). Interestingly, although there is some difference between the onset potentials of isomers, the proposed strategy provides a good site-selectivity, which cannot be achieved via traditionally anodic coupling reactions. For instance, the polymerization of 1,4-DBN occurs at 1- and 4-positions and the carbon-carbon coupling reaction of 1,5-DBN takes place at 1- and 5-positions, supporting the high selectivity at halogen-substituted positions. Similar results are also found in the electrochemical polymerization of 9,10-dibromoanthracene (9,10-DBA) and 2,6-dibromoanthracene (2,6-DBA), which also supports the good site-selectivity of as-proposed electrochemically-dehalogenated C—C coupling strategy (FIGS. 12a-12b and FIGS. 13a-13b). All these results clearly indicate that simultaneous polymerization and film fabrication of benzene/PAHs through electrochemically-dehalogenated C—C coupling reaction is feasible.

TABLE 2

The onset potential of halogen-substituted precursors.

| Chemicals | Onset potential (V vs. Fc$^{+/0}$) | Solvent |
|---|---|---|
| 1,4-diiodobenzene | −1.92 | MeCN (FIG. 1) |
| 1,4-dibromobenzene | −2.19 | MeCN (FIG. 8a) |
| 1,4-dibromonaphthalene | −2.13 | MeCN (FIG. 9a) |
| 1,5-dibromonaphthalene | −2.15 | MeCN (FIG. 11a) |
| 9,10-dibromoanthracene | −1.78 | MeCN/Toluene (v/v 8:2) (FIG. 12a) |
| 2,6-dibromoanthracene | −1.95 | MeCN/Toluene (v/v 8:2) (FIG. 13a) |
| 2,7-dibromophenanthrene | −2.31 | MeCN/Toluene (v/v 8:2) (FIG. 14a) |
| 2,7-dibromopyrene | −2.06 | MeCN/Toluene (v/v 8:2) (FIG. 15a) |
| 1,3,5-tribromobenzene | −2.27 | DMSO (FIG. 16a) |
| 1,3,5-tris(4-bromophenyl)benzene | −2.36 | DMSO (FIG. 17a) |

CONCLUSION

In summary, the electrochemically dehalogenated C—C coupling strategy to simultaneously polymerize halogen-substituted aromatic compounds and form smooth films on various planar cathodes is successfully demonstrated, in which the electrons can directly serve as the catalysts. This metallic/organometallic-catalyst-free strategy can prevent the undesired deposition of metal/organometal onto the surface of the cathode, thereby ensuring the purity of the as-prepared thin films. Notably, this electrochemically-dehalogenated C—C coupling method provides excellent selectivity, in which the coupling reaction may take place at the halogen-substituted position. Forming the polymers under cathodic potential during electrolysis exhibits advantages, for instance different conductive substrates (i.e., platinum, gold, nickel, silicon, and stainless steel) may be employed. Furthermore, the thicknesses of the as-prepared thin films are easily controllable through tuning the reaction time at a certain current level. We believe that the size and shape of the as-prepared thin films are directly dependent upon various conductive substrates. We believe that this electrochemically-dehalogenated C—C coupling strategy would be extended to build carbon-carbon bonds between heteroatom (e.g. N, S, O, or P)-containing aromatic compounds. Also, this strategy would become a powerful tool for the construction of carbon-carbon bonds in 1D, 2D or 3D organic frameworks, and the fabrication of smooth semiconducting thin films simultaneously. Clearly, the as-fabricated films should have great merits in various organic optoelectrical devices.

Example 1

The Preparation of poly(p-phenylene) (II)

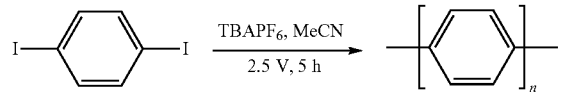

Under nitrogen atmosphere, 1 mmol TBAPF$_6$ dissolves in 10 mL dried MeCN (i.e. TBAPF$_6$'s concentration is 0.1 mmol/mL) and is evenly separated into two parts noted as solution A and solution C. 1,4-diiodobenzene (0.1 mmol) is added into the solution C (i.e. 1,4-diiodobenzene's concentration is 0.02 mmol/mL) and pre-stirred for ~5 min to obtain a homogenous solution. The resulting solution A and diiodobenzene-containing solution C are then added into the anodic part and the cathodic part of a flame dried divided cell equipped with Pt (anode) and Si (cathode or other conductive substrates). After that, the electrolyte cell is sealed and brought out of the glove box for polymerization via electrochemically-dehalgonated C—C coupling reaction under the condition of constant voltage of 2.5 V for about 5 hours at room temperature. After the reaction, the cathode is removed from the solution carefully and gently immersed into a sample bottle filled with toluene, and cleaned with toluene, DCM, EtOH and water several times. Then, the film is pre-dried under the air before it is transferred into a vacuum oven (100° C.) for further drying. The FTIR spectra are recorded on a PerkinElmer Spectrum Two FTIR Spectrometer. As shown in FIG. 5a, compared with its precursor, the typical band of C—I vibration located at 461 cm$^{-1}$ disappears, while the instructive out-of-plane C—H bending vibration appears at 814 cm$^{-1}$ representing the para-substituted phenylene moiety. Other two bands located at 756 cm$^{-1}$ and 698 cm$^{-1}$ is due to the terminal mono-substituted phenyl rings and the ring pucker. The procedure of preparation of PPP thin films with 1,4-dibromobenzene as a starting material is almost the same but prolonging the reaction time (under the conditions of constant voltage at 2.8 V for 24 hours). Notably, the usage of organic bases (i.e., adding 3 equivalent of triethylamine or N,N-diisopropylethylamine) can significantly decrease the reaction time to 12 hours without sacrificing the quality of the film. The FTIR spectrum of 1,4-dibromobenzene is shown in FIG. 8b. The instructive para-substituted peak emerged at 825 cm$^{-1}$ as well as the disappearance of C—Br vibration located at 1064 cm$^{-1}$ and 470 cm$^{-1}$ together confirms the formation of PPP(Br).

Example 2

The Preparation of 1,5-polynaphthalene (II)

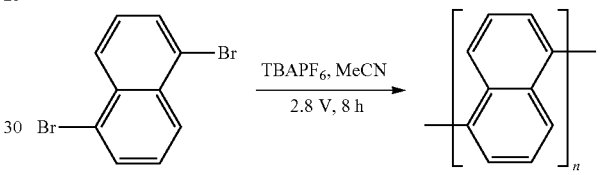

Figure 11B:
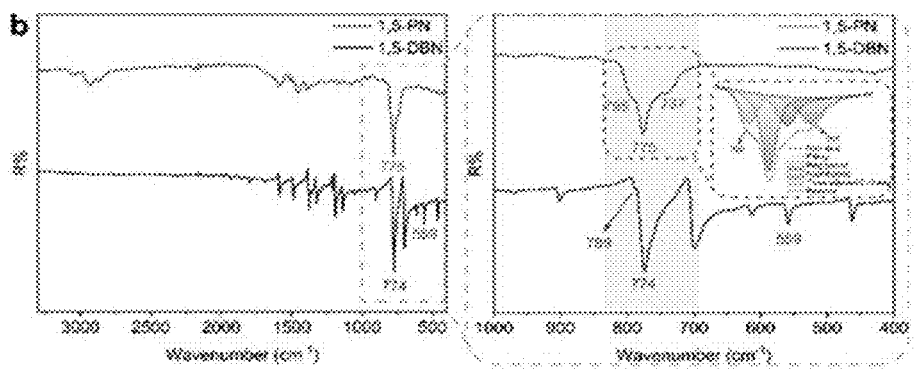
FIG. 11b illustrates a FTIR spectrum (left) of an embodiment of the as-prepared 1,5-PN thin film of the present invention and the enlarged spectrum (right) in the range of 1100~400 cm$^{-1}$ framed by dash lines.
Figure 12A:
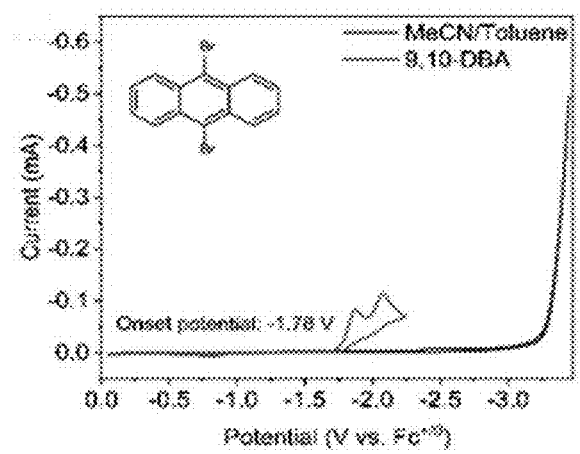
FIG. 12a illustrates a cyclic voltammetry graph of an embodiment of 9,10-dibromoanthracene (9,10-DBA) of the present invention in MeCN/Toluene (v/v 8:2) solution containing 0.1 M $TBAPF_6$ at the scanning rate of 50 mV/s.
Figure 12B:
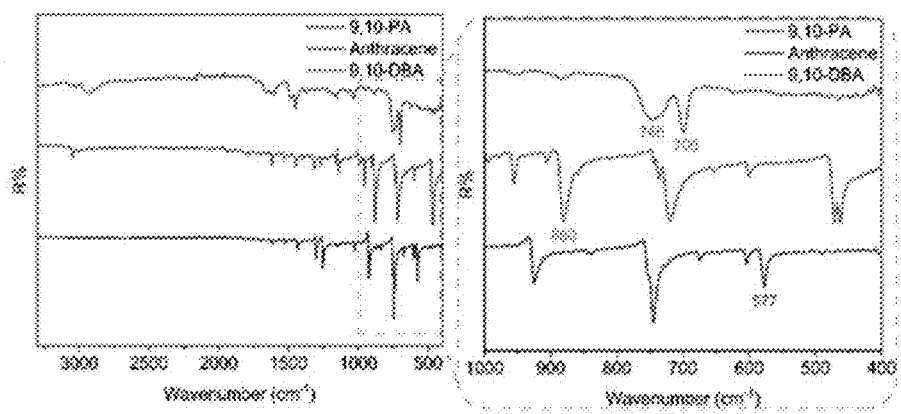
FIG. 12b illustrates a FTIR spectrum of an embodiment of the as-prepared 9,10-PA thin film of the present invention and the enlarged spectrum in the range of 1000-400 cm$^{-1}$ framed by dash lines.

Under nitrogen atmosphere, 1 mmol TBAPF$_6$ dissolves in 10 mL dried MeCN and is evenly separated into two parts noted as solution A and solution C. 1,5-dibromonaphthalene (0.1 mmol) is added into the solution C and pre-stirred for ~5 min to obtain a homogenous solution. The resulting solution A and the dibromonaphthalene-containing solution C are then separately added into at the anodic part and the cathodic part of a flame dried divided cell equipped with Pt (anode) and Si (cathode or other conductive substrates). After that, the electrolyte cell is sealed and brought out of the glove box for polymerization via electrochemically-dehalogenated C—C coupling reaction under the condition of constant voltage of 2.8 V for about 8 hours at room temperature. After the reaction, the cathode is removed from the solution carefully and gently immersed into a sample bottle filled with toluene, and cleaned with toluene, DCM, EtOH and water several times. Then, the film is pre-dried under the air before it is transferred into a vacuum oven (80° C.) for further drying. As shown in FIG. 11b, the as-prepared 1,5-PN remains the strong band located at approximate 774 cm$^{-1}$ indicating that the naphthalene structure does not change during the electropolymerization. The decline of C—Br vibration at 559 cm$^{-1}$ and the shiftiness of ring pucker from 700 cm$^{-1}$ of the 1,5-DBN to 737 cm$^{-1}$ of the as-prepared 1,5-PN thin film support the coupling occurring at 1- and 5-position. Furthermore, the instructive vibration of three-adjacent C—H wag shift from 789 cm$^{-1}$ to 795 cm$^{-1}$ and the broader absorption peak in the range of 825~700 cm$^{-1}$ supporting the successful electropolymerization.

Example 3

The Preparation of 1,4-polynaphthalene (IV)

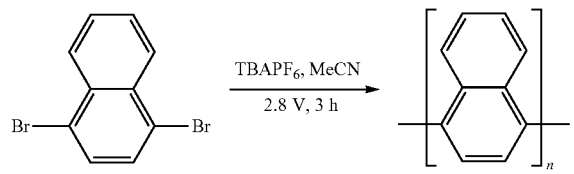

Under nitrogen atmosphere, 1 mmol TBAPF$_6$ dissolves in 10 mL dried MeCN and is evenly separated into two parts noted with solution A and solution C. 1,4-dibromonaphthalene (0.1 mmol) is added into the solution C and pre-stirred for ~5 min to obtain a homogenous solution. The resulting solution A and the dibromonaphthalene-containing solution C are then added into at the anodic part and the cathodic part of a flame dried divided cell equipped with Pt (anode) and Si (cathode). After that, the electrolyte cell is sealed and brought out of the glove box for polymerization via electrochemically-dehalogenated C—C coupling reaction under the condition of constant voltage of 2.8 V for about 3 hours at room temperature. After the reaction, the cathode is removed from the solution carefully and gently immersed into sample bottle filled with toluene, and cleaned with toluene, DCM, EtOH and water several times. Then, the film is pre-dried under the air before it is transferred into a vacuum oven (80° C.) for further drying. The FTIR spectrum was shown in FIG. 9b. The wider bands around 774 cm$^{-1}$ are the specific structural vibration of naphthalene. The second strongest peak appears at 842 cm$^{-1}$ representing the two-adjacent C—H wag on the naphthalene ring, which demonstrates the polymerization taking place at the 1- and 4-position. Additionally, compared with the precursor, the band at 540 cm$^{-1}$ representing the C—Br vibration decreases a lot indicating the reduce in the proportion of C—Br in the thin film, which, from the side, proves the polymerization occurring at 1- and 4-position.

Example 4

The Preparation of 9,10-polyanthracene (VII)

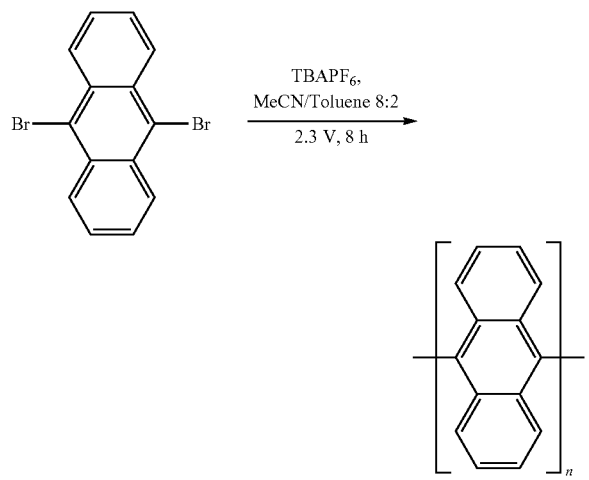

Under nitrogen atmosphere, 1 mmol TBAPF$_6$ dissolves in 10 mL dried MeCN/toluene mixture (v/v=8:2) and evenly separated into two parts noted with solution A and solution C. 9,10-dibromoanthracene (0.1 mmol) is added into the solution C and pre-stirred for ~5 min to obtain a homogenous solution. The resulting solution A and the dibromoanthracene solution C are then added into at the anodic part and the cathodic part of a flame dried divided cell equipped with Pt (anode) and Si (cathode). After that, the electrolyte cell is sealed and brought out of the glove box for polymerization via electrochemically-dehalogenated C—C coupling reaction under the condition of constant voltage of 2.3 V for about 8 hours at room temperature. After the reaction, the cathode is removed from the solution carefully and gently immersed into sample bottle filled with toluene, and cleaned with toluene, DCM, EtOH and water several times. Then, the film is pre-dried under the air before it is transferred into a vacuum oven (80° C.) for further drying.

Example 5

The Preparation of 2,6-polyanthracene (VIII)

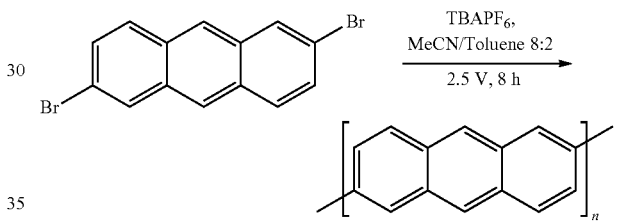

Figure 13A:
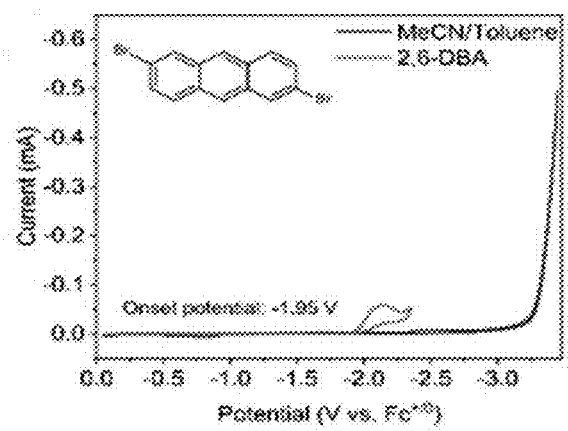
FIG. 13a illustrates a cyclic voltammetry graph of an embodiment of the 2,6-dibromoanthracene (2,6-DBA) of the present invention in MeCN/Toluene (v/v 8:2) solution containing 0.1 M $TBAPF_6$ at the scanning rate of 50 mV/s.
Figure 13B:
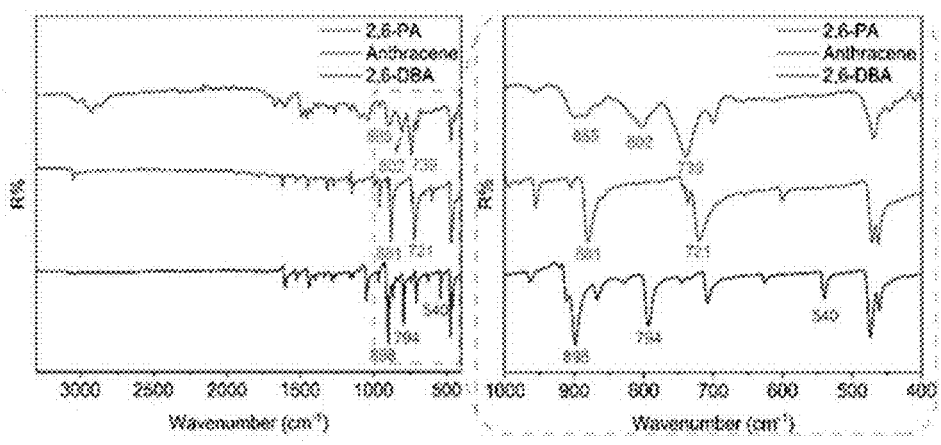
FIG. 13b illustrates a FTIR spectrum (left) of an embodiment of the as-prepared 2,6-PA thin film of the present invention and the enlarged spectrum in the range of 1000-400 cm$^{-1}$ framed by dash lines.
Figure 14A:
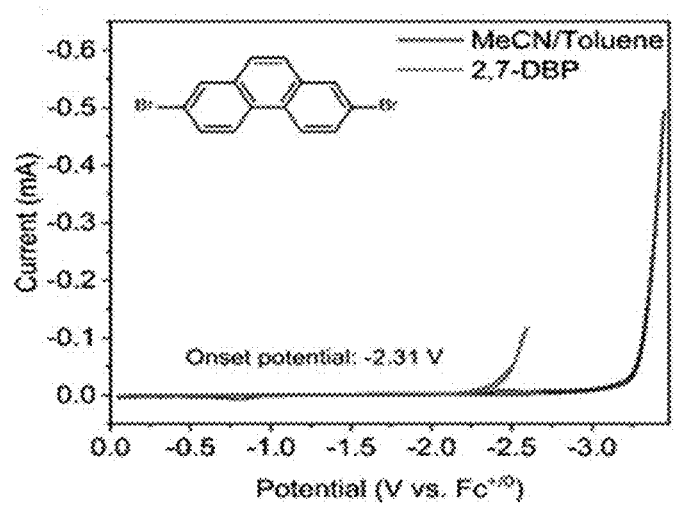
FIG. 14a illustrates a cyclic voltammetry graph of an embodiment of the 2,7-dibromophenanthrene of the present invention in MeCN/Toluene (v/v 8:2) solution containing 0.1 M $TBAPF_6$ at the scanning rate of 50 mV/s.

Under nitrogen atmosphere, 1 mmol TBAPF$_6$ dissolves in 10 mL dried MeCN/toluene mixture (v/v=8:2) and is evenly separated into two parts noted with solution A and solution C. 2,6-dibromoanthracene (0.1 mmol) was added into the solution C and pre-stirred for ~5 min to obtain a homogenous solution. The resulting solution A and the dibromoanthracene-containing solution C are then added into at the anodic part and the cathodic part of a flame dried divided cell equipped with Pt (anode) and Si (cathode). After that, the electrolyte cell is sealed and brought out of the glove box for polymerization via electrochemically-dehalogenated C—C coupling reaction under the condition of constant voltage of 2.5 V for about 8 hours at room temperature. After the reaction, the cathode is removed from the solution carefully and gently immersed into sample bottle filled with toluene, and cleaned with toluene, DCM, EtOH and water several times. Then, the film is pre-dried under the air before it is transferred into a vacuum oven (80° C.) for further drying. As shown in FIG. 13b, the FTIR spectra of the as-prepared 2,6-PA thin film, the anthracene monomer, and the 2,6-dibromoanthracene are illustrated. The 9- and 10-positions are preserved, which is supported by the remains of the instructive absorption of 9- and 10-C—H wags at around 885 cm$^{-1}$. The shiftiness of identical two-adjacent C—H wags absorption to 802 cm$^{-1}$ in conjunction with the disappearance of C—Br vibration at 540 cm$^{-1}$ strongly verifies the coupling reaction takes place at the 2- and 7-positions which were occupied by the bromine. However, the band around 739 cm$^{-1}$ attributes to the four-adjacent C—H wags.

Example 6

The Preparation of 2,7-polyphenathrene (X)

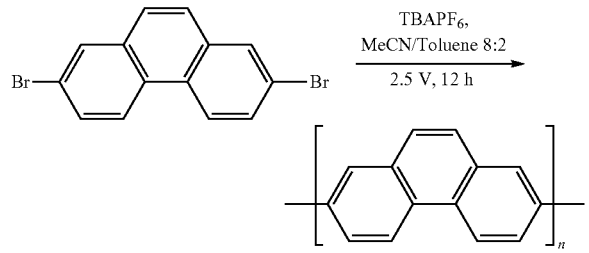

Figure 14B:
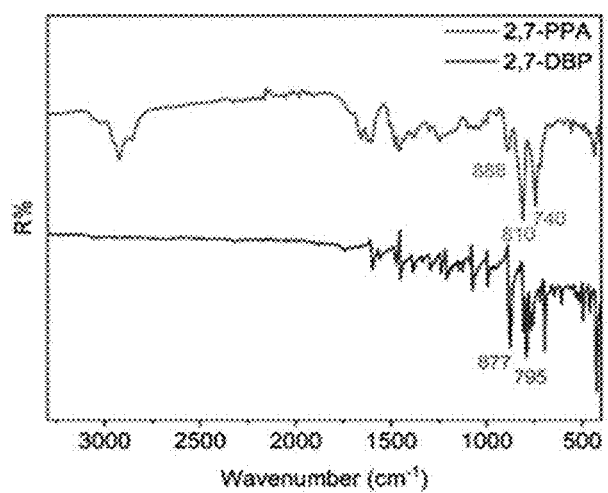
FIG. 14b illustrates FTIR spectra of an embodiment of the as-prepared 2,7-PPA thin film of the present invention and its corresponding 2,7-dibromophenanthrene precursor.
Figure 15A:
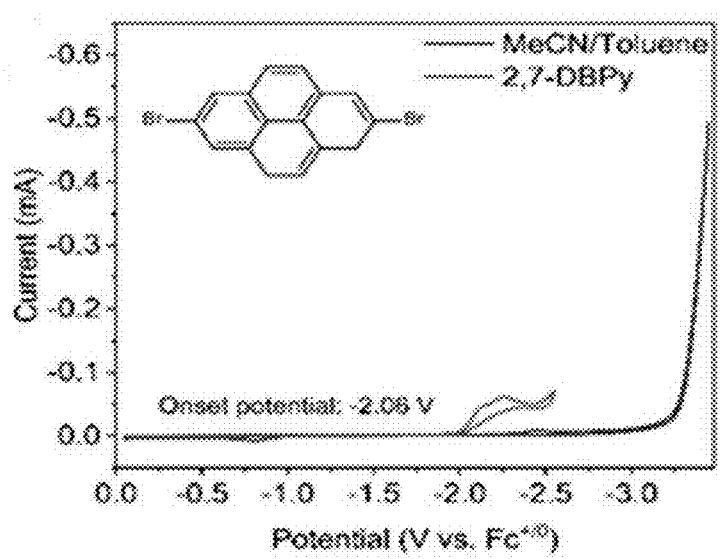
FIG. 15a illustrates a cyclic voltammetry graph of an embodiment of the 2,7-dibromopyrene of the present invention in MeCN/Toluene (v/v 8:2) containing 0.1 M $TBAPF_6$ at the scanning rate of 50 mV/s.

Under nitrogen atmosphere, 1 mmol TBAPF$_6$ dissolves in 10 mL dried MeCN/toluene mixture (v/v=8:2) and is evenly separated into two parts noted with solution A and solution C. 2,7-dibromophenanthrene (0.1 mmol) is added into the solution C and pre-stirred for ~5 min to obtain a homogenous solution. The resulting solution A and solution C are then added into at the anodic part and the cathodic part of a flame dried divided cell equipped with Pt (anode) and Si (cathode). After that, the electrolyte cell is sealed and brought out of the glove box for polymerization via electrochemically-dehalogenated C—C coupling reaction under the condition of constant voltage of 2.5 V for about 12 hours at room temperature. After the reaction, the cathode is removed from the solution carefully and gently immersed into sample bottle filled with toluene, and cleaned with toluene, DCM, EtOH and water several times. Then, the film is pre-dried under the air before it is transferred into a vacuum oven (80° C.) for further drying. As shown in FIG. 14b, the instructive two-adjacent C—H wag shifts from 795 cm$^{-1}$ of 2,7-DBP to 810 cm$^{-1}$ of 2,7-PPA represents the leave of bromine. The band at 888 cm$^{-1}$ normally indicates the lone C—H wag in the meta- or 1,2,4-trisubstituted benzene, which is associated with the band at 877 cm$^{-1}$ of 2,7-DBP. Moreover, compared with the 2,7-DBP spectrum, there are wide bands around the 740 cm$^{-1}$ attributing to the meta- or 1,2,4-trisubstitued phenyl ring pucker, indicating the polymerization take place on the 2- and 7-positions.

Example 7

The Preparation of 2,7-polypyrene (XII)

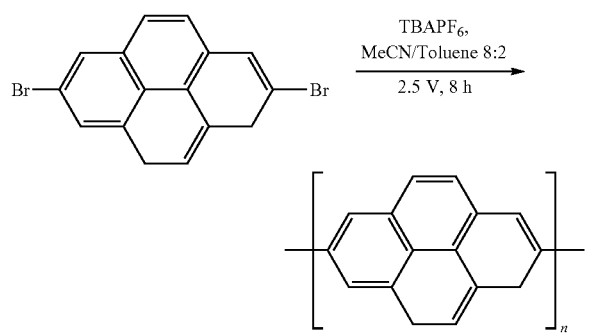

Figure 15B:
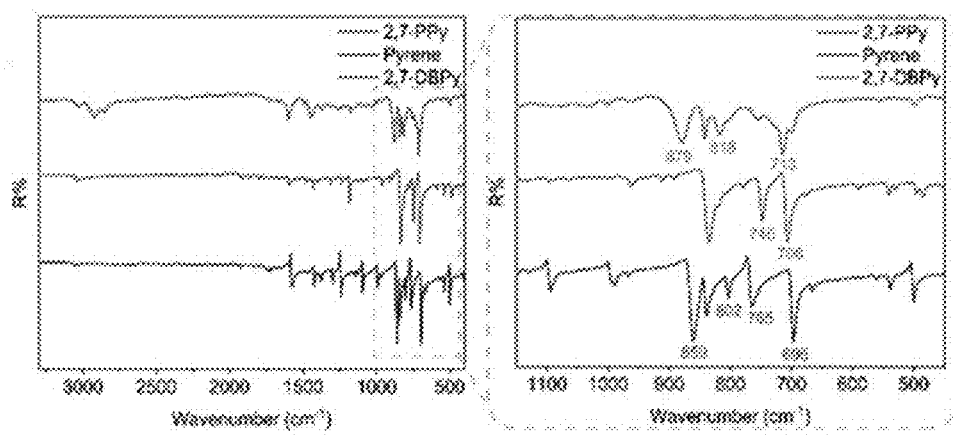
FIG. 15b illustrates a FTIR spectrum (left) of an embodiment of the as-prepared 2,7-PPy thin film of the present invention and the enlarged spectrum (right) in the range of 1150~450 cm$^{-1}$ framed by dash lines.
Figure 16A:
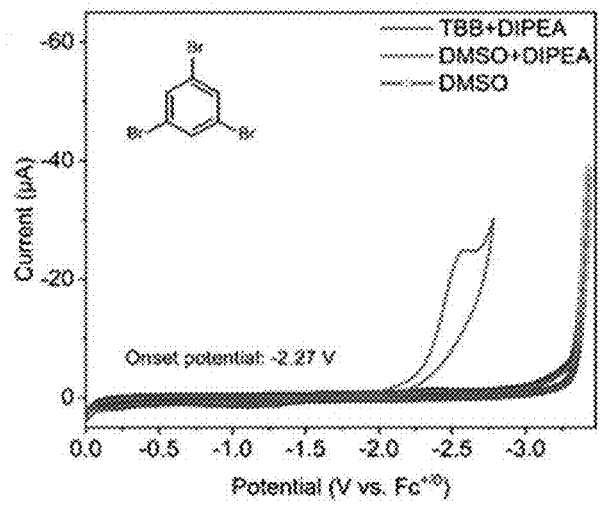
FIG. 16a illustrates a cyclic voltammetry graph of an embodiment of the 1,3,5-tribromobenzene (TBB) of the present invention in DMSO solution containing 0.1 M TBAPF6 and 3 equivalents of N,N-Diisopropylethylamine (DIPEA) at the scanning rate of 50 mV/s.
Figure 16B:
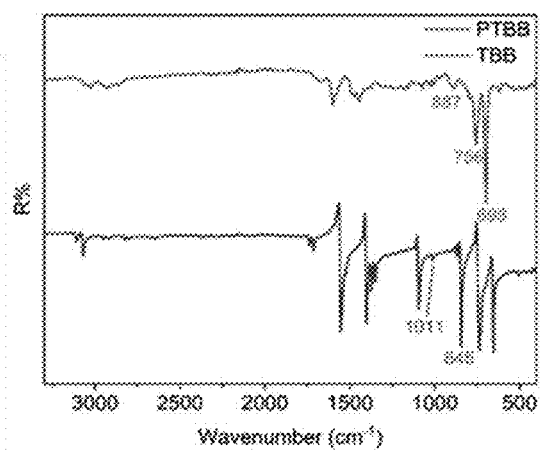
FIG. 16b illustrates a FTIR spectrum of an embodiment of the as-prepared Poly-TBB (PTBB) thin film of the present invention.
Figure 16C:
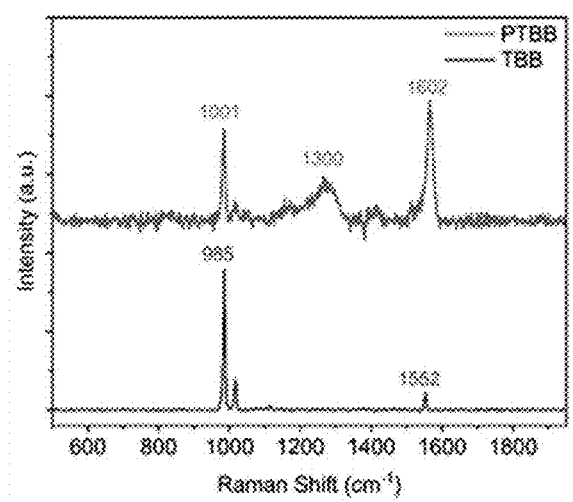
FIG. 16c illustrates Raman spectra of an embodiment of the as-prepared PTBB thin film of the present invention and its corresponding TBB monomer.
Figure 16D:
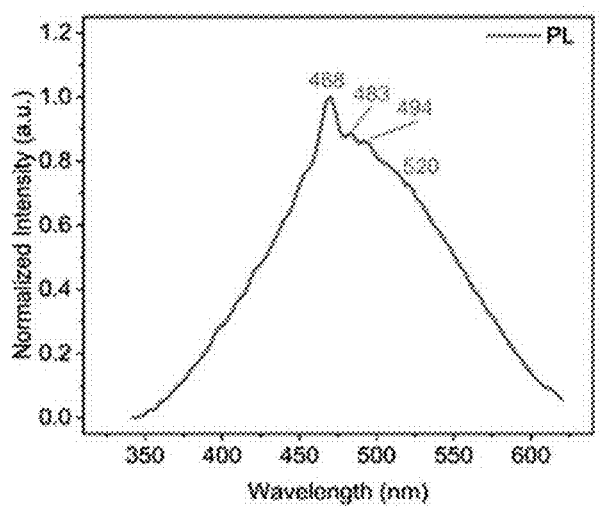
FIG. 16d illustrates a fluorescent spectrum of an embodiment of the as-prepared PTBB thin film of the present invention.
Figure 17A:
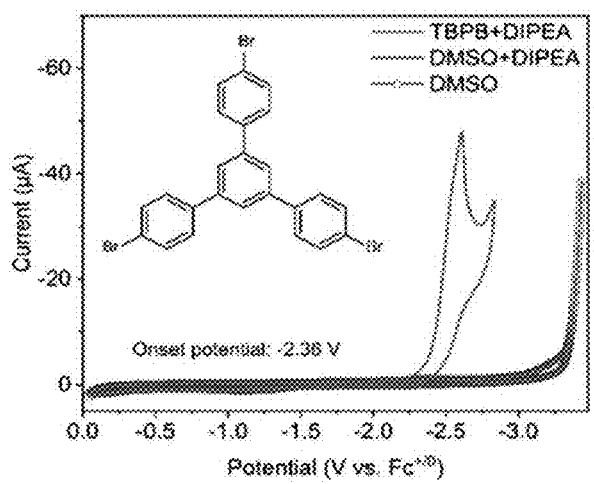
FIG. 17a illustrates a cyclic voltammetry graph of an embodiment of 1,3,5-tris(4-bromophenyl)benzene (TBPB) of the present invention in DMSO solution containing 0.1 M $TBAPF_6$ and 3 equivalents of DIPEA at the scanning rate of 50 mV/s.
Figure 17B:
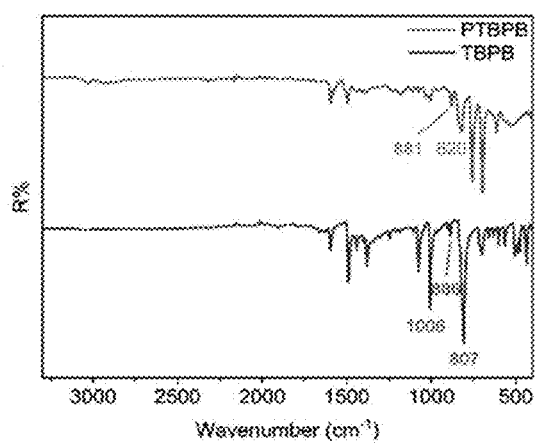
FIG. 17b illustrates a FTTR spectrum of an embodiment of the as-prepared poly-TBPB (PTBPB) thin film of the present invention.
Figure 17C:
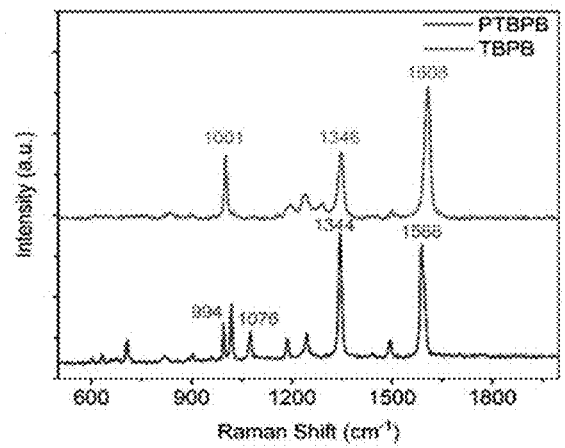
FIG. 17c illustrates Raman spectra of an embodiment of the as-prepared PTBPB thin film of the present invention and its corresponding TBPB monomer.
Figure 17D:
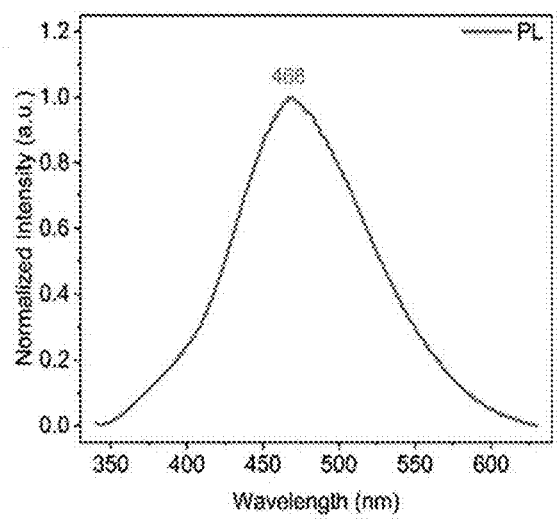
FIG. 17d illustrates a fluorescent spectrum of an embodiment of the as-prepared PTBPB thin film of the present invention.
Figure 18A:
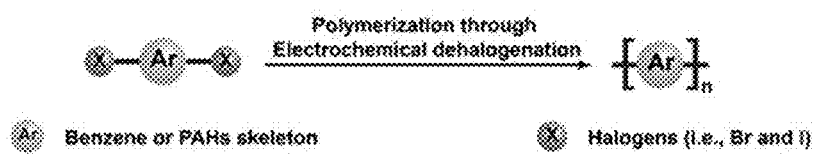
FIG. 18a illustrates a brief scheme of an embodiment of the electrochemical dehalogenation of the present invention.
Figure 18B:
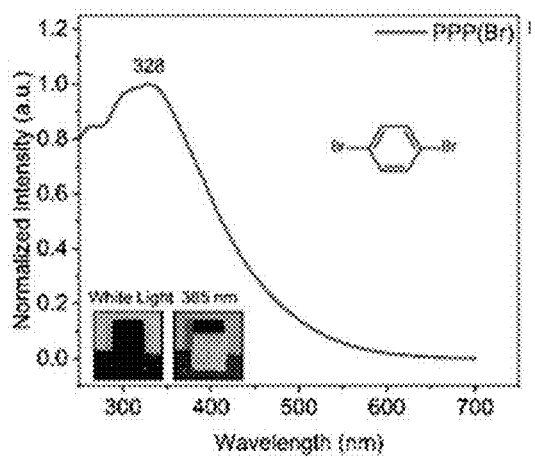
FIG. 18b illustrates a UV-Vis absorption graph of an embodiment of PPP(Br) of the present invention, with inserts of photographs corresponding to the as-prepared thin films taken under white light and 365 nm light.
Figure 18C:
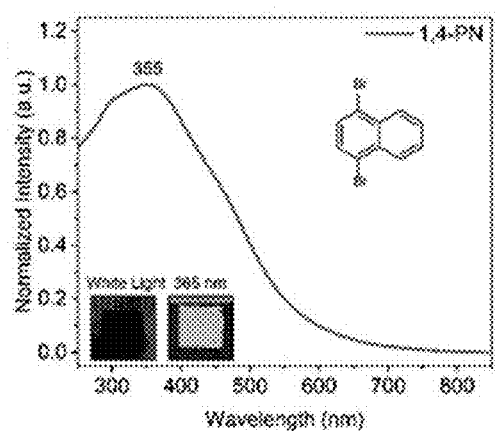
FIG. 18c illustrates a UV-Vis absorption graph of an embodiment of 1,4-PN of the present invention, with inserts of photographs corresponding to the as-prepared thin films taken under white light and 365 nm light.
Figure 18D:
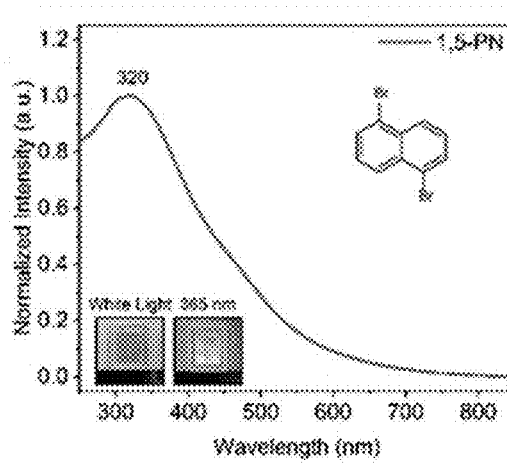
FIG. 18d illustrates a UV-Vis absorption graph of an embodiment of 1,5-PN of the present invention, with inserts of photographs corresponding to the as-prepared thin films taken under white light and 365 nm light.
Figure 18E:
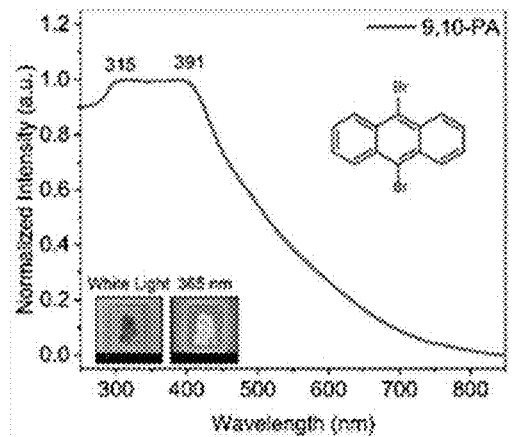
FIG. 18e illustrates a UV-Vis absorption graph of an embodiment of 9,10-PA of the present invention, with inserts of photographs corresponding to the as-prepared thin films taken under white light and 365 nm light.
Figure 18F:
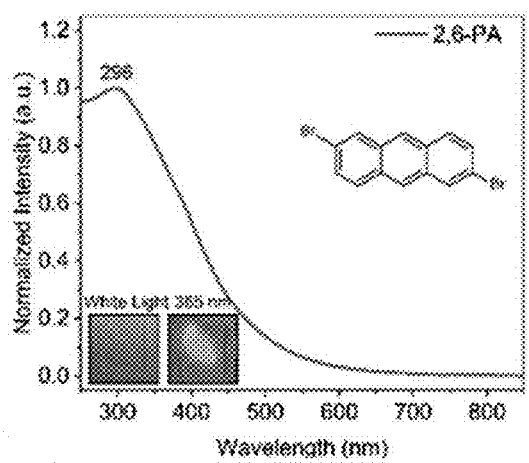
FIG. 18f illustrates a UV-Vis absorption graph of an embodiment of 2,6-PA of the present invention, with inserts of photographs corresponding to the as-prepared thin films taken under white light and 365 nm light.
Figure 18G:
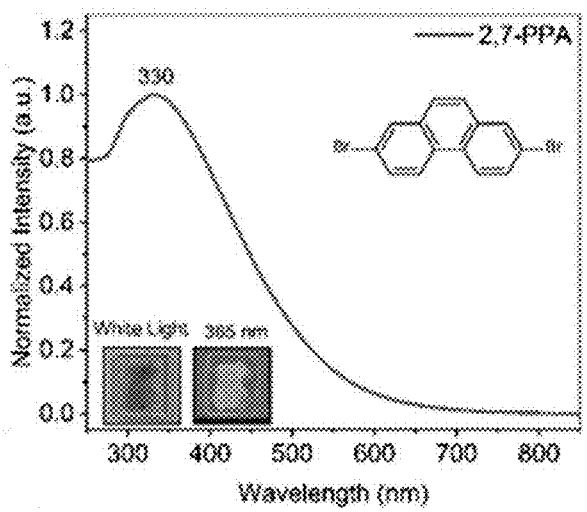
FIG. 18g illustrates a UV-Vis absorption graph of an embodiment of 2,7-PPA of the present invention, with inserts of photographs corresponding to the as-prepared thin films taken under white light and 365 nm light.
Figure 18H:
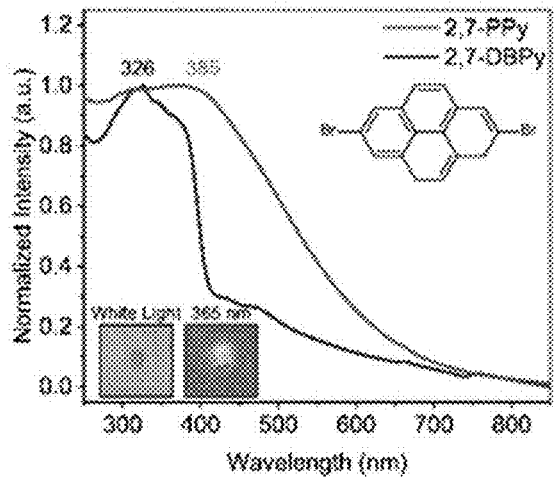
FIG. 18h illustrates a UV-Vis absorption graph of an embodiment of 2,7-PPy of the present invention, with inserts of photographs corresponding to the as-prepared thin films taken under white light and 365 nm light.
Figure 18I:
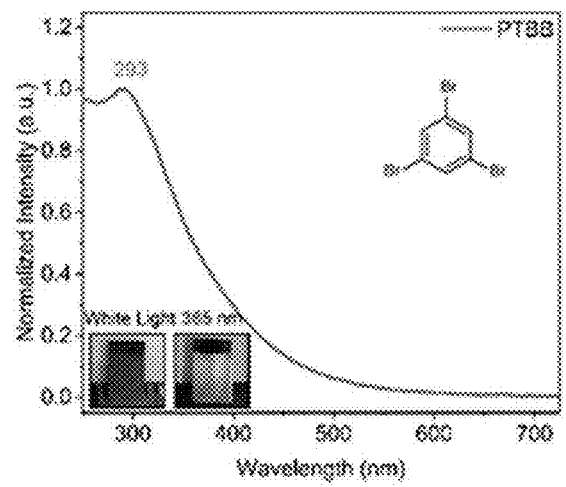
FIG. 18i illustrates a UV-Vis absorption graph of an embodiment of PTBB of the present invention, with inserts of photographs corresponding to the as-prepared thin films taken under white light and 365 nm light.
Figure 18J:
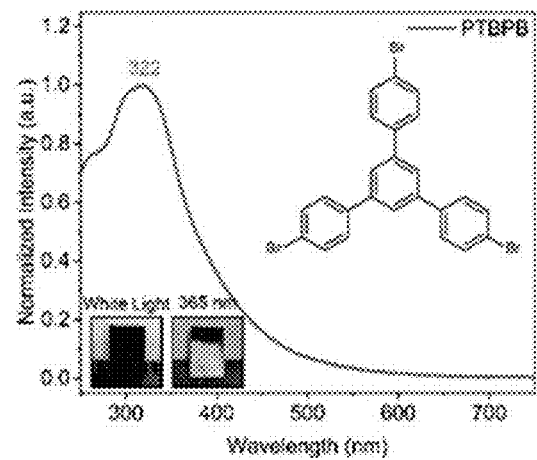
FIG. 18j illustrates a UV-Vis absorption graph of an embodiment of PTBPB of the present invention, with inserts of photographs corresponding to the as-prepared thin films taken under white light and 365 nm light.

Under nitrogen atmosphere, 1 mmol TBAPF$_6$ dissolves in 10 mL dried MeCN/toluene mixture (v/v=8:2) and evenly separated into two parts noted with solution A and solution C. 2,7-dibromopyrene (0.04 mmol) is added into the solution C and pre-stirred for ~5 min to obtain a homogenous solution. The resulting solution A and solution C are then added into at the anodic part and the cathodic part of a flame dried divided cell equipped with Pt (anode) and Si (cathode). After that, the electrolyte cell is sealed and brought out of the glove box for polymerization via electrochemically-dehalogenated C—C coupling reaction under the condition of constant voltage of 2.5 V for 8 hours at room temperature. After the reaction, the cathode is removed from the solution carefully and gently immersed into sample bottle filled with toluene, and cleaned with toluene, DCM, EtOH and water several times. Then, the film is pre-dried under the air before it is transferred into a vacuum oven (80° C.) for further drying. As shown in FIG. 15b, the bands around 700 cm$^{-1}$ assigned to the ring pucker. Compared with the commercially available pyrene monomer (purchased from Sigma-Aldrich), the spectrum of as-prepared 2,7-PPy thin film almost shows no band at 746 cm$^{-1}$ which is assigned to the out-of-plane vibration of the three adjacent C—H bonds of pyrene ring. However, the band at 818 cm$^{-1}$ of as-prepared 2,7-PPy thin film enhanced a lot which can be ascribed to the two adjacent C—H wag of pyrene ring. The bands at 879 cm$^{-1}$ represents the lone C—H wag adjacent to the 2- and 7-position, which is associated with the band at 859 cm$^{-1}$ of 2,7-dibromopyrene precursor. Additionally, the decrease of C—Br bond at 500 cm$^{-1}$ in conjunction with the shift of lone and two adjacent C—H wags support the successful fabrication of 2,7-PPy thin film.

Example 8

The Preparation of 1,3,5-polybenzene (PTBB)

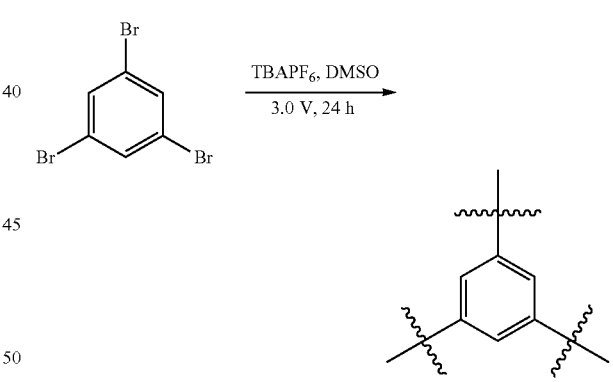

In a nitrogen-filled glovebox, 1 mmol TBAPF$_6$ is dissolved in 10 mL dried DMSO and evenly separated into two parts, noted as solution A and solution C. 1,3,5-Tribromobenzene (0.1 mmol) and 3 equivalents of N,N-Diisopropylethylamine (DIPEA) was added into the solution C and pre-stirred for ~5 min to obtain a homogenous solution. Then, solution A and the tribromobenzene-containing solution C were separately added into anodic part and cathodic part of a flame-dried divided cell (equipped with Pt (anode) and Si (cathode)). After that, the electrolyte cell was sealed and brought out of the glove box for the polymerization via the electrochemically-dehalogenated C—C coupling reaction under the condition of constant voltage at 3.0 V for about 24 hours at room temperature. After the reaction, the cathode was removed from the solution carefully and gently immersed into the sample bottle filled with toluene, and cleaned with toluene, DCM, EtOH and water several times. Then, the film is pre-dried in the air before transferring this film into vacuum oven (100° C.) for further drying.

Example 9

The Preparation of poly(1,3,5-triphenylbenzene) (PTBPB)

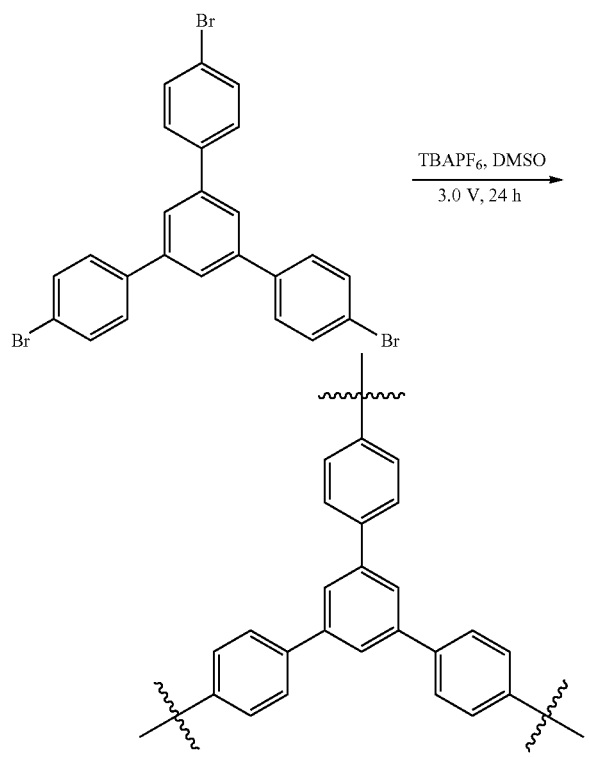

In a nitrogen-filled glovebox, 1 mmol TBAPF$_6$ was dissolved in 10 mL of dried DMSO and evenly separated into two parts, noted as solution A and solution C. 1,3,5-tris(4-bromophenyl)benzene (0.03 mmol) and 3 equivalents of DIPEA was added into the solution C and pre-stirred for ~15 min to obtain a homogenous solution. Then, solution A and the tris(bromophenyl)benzene-containing solution C were separately added into anodic part and cathodic part of a flame-dried divided cell (equipped with Pt (anode) and Si (cathode)). After that, the electrolyte cell was sealed and brought out of the glove box for the polymerization via the electrochemically-dehalogenated C—C coupling reaction under the condition of constant voltage at 3.0 V for about 24 hours at room temperature. After the reaction, the cathode was removed from the solution carefully and gently immersed into the sample bottle filled with toluene, and cleaned with toluene, DCM, EtOH and water several times. Then, the film is pre-dried in the air before transferring this film into vacuum oven (100° C.) for further drying.

Example 10

A Setup of an Electrochemical Cell

Figure 21A:
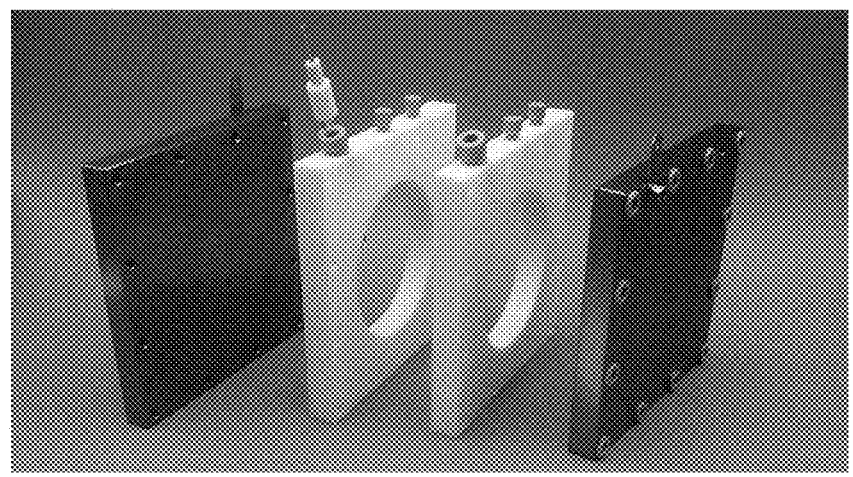
FIG. 21a illustrates a diagram of an embodiment of the electrochemical cell of the present invention.

FIG. 21a shows a diagram of an electrochemical cell that may be used to conduct the method of the present invention, in which the arrangement of two outer metal plates and two middles plates are shown.

Figure 21B:
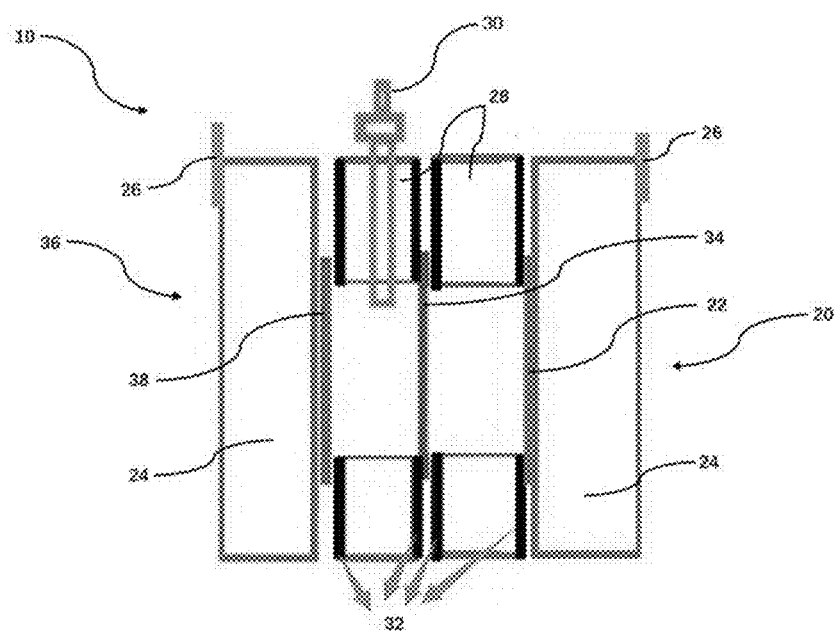
FIG. 21b illustrates a schematic cross-sectional diagram of the electrochemical cell in FIG. 21a, with other components.

FIG. 21b shows a schematic cross-sectional diagram of the electrochemical cell, 10, with other components. There are provided two outer metal plates, 24, between which are provided two middle plates, 28 stacked with each other and each middle plate, 28, containing a central cavity. A membrane, 34 is provided between the two middle plates, 28. A cathodic electrode, 38 is provided between one of the outer metal plates, (i.e. the left metal plate), 24 and one of the middle plates (i.e. the left middle plate), 28. An anodic electrode, 22 is provided between the other outer metal plate, (i.e. the right metal plate), 24 and the other middle plate, (i.e. the right middle plate), 28. A cathodic region, 36 is provided and is defined by the left metal plate 24, the left middle plate, 28, and the membrane, 30. The cathodic electrode 38, is located at the cathodic region, 36. An anodic region, 20 is provided and is defined by the right metal plate, 24, the right middle plate, 28, and the membrane, 30. The anodic electrode, 22 is located at the anodic region, 20. There are a plurality of openings on the top side of the middle plates, 28. A reference electrode, 30 is inserted into the cavity of the middle plate, 28 from one of the openings from the outside. Gaskets, 32 are disposed on both sides facing the metal plates, 24 of each of the middle plates, 28. Current collectors, 26 are provided at the top of each of the metal plates 24. The setup allows good contact of the electrodes with the precursor and polymer films. It also allows homogenous current density on the electrode when fabricating polymer films, including large-scale films with a scaled-up version of the design.

Example 11

The Transfer of as-Obtained Thin Films

Capillary-force-assisted clean-stamp transfer method was employed in this case the transfer of the two-dimensional film onto different substrates for other characterization. Briefly, the PDMS stamp was prepared by mixing the Sylgard and hardener at the ratio of 9:1 (Dow Corning, 184 silicone elastomer kit). Glass slides were cleaned with acetone and isopropanol under ultrasonication and placed in a clean petri dish before pouring the mixed PDMS solution. The mixture was left in a vacuum box for about 1.5 hours to make sure all the bubbles in the solution were removed. The PDMS mixture was then baked at 50° C. for 12 hours. The prepared PDMS films were cut into desired sizes and cleaned with isopropanol, DI water, and dried before use. The PDMS stamps were placed on the top of boiling water for a few seconds and then gently pressed onto the as-prepared thin film. A few seconds were given to relax the film and peel it off from one side. The transferred films were preserved in a clean container for further transferring to other substrates. A simple stamping procedure is sufficient to leave the films onto other substrates. Additionally, directly tearing the film with tweezers from the substrate is also available for the transfer of micrometer-thicken films.

Non-limiting embodiments of the invention:
A method for fabricating a chemical composition containing an aromatic polymer, comprising the steps of:
a) providing an anodic region and a cathodic region;
b) providing an arene precursor;
c) providing an electrochemical potential between the anodic region and the cathodic region;
d) reacting the arene precursor via the electrochemical potential to form the chemical composition, where the reacting step d) further comprises the step of conducting a cathodic reaction.

2. The method according to embodiment 1, where the cathodic reaction further includes the step of conducting a dehalogenation coupling reaction of the arene precursor to form the chemical composition.

3. The method according to embodiment 1 or 2, where the method further including the step of providing an anodic electrode at the anodic region, a cathodic electrode at the cathodic region, and a solution comprising an electrolyte, where the anodic electrode and the cathodic electrode are at least partially contacting the solution.

4. The method according to any one of embodiments 1 to 3, where the aromatic polymer is a conjugated polymer; optionally, the aromatic polymer is an unsubstituted conjugated polymer.

5. The method according to any one of embodiments 1 to 4, where the aromatic polymer takes a form selected from the group of a dimeric form, an oligomeric form, a polymeric form, and a combination thereof.

6. The method according to any one of embodiments 1 to 5, where the arene precursor is selected from the group of a phenyl halide, a halogenated polycyclic aromatic hydrocarbon, and a combination thereof, and where the arene precursor includes more than one halogen.

7. The method according to any one of embodiments 1 to 6, the halogen is selected from the group of a fluorine, a chlorine, a bromine or an iodine, and a combination thereof, preferably, the halogen includes a bromine or an iodine.

8. The method according to any one of embodiments 1 to 7, wherein the arene precursor is a dihaloarene, optionally, the arene precursor is selected from the group of dihalobenzene, dihalonaphthalene, dihalobiphenyl, dihaloanthracene, dihalophenanthrene, dihalophenalene, dihalopyrene, diphenylbenzene, dihalonaphthacene, dihalotriphenylene, dihalochrysene, dihalobenzo[c]phenanthrene, dihalobenz[a]anthracene, and a combination thereof.

9. The method according to any one of embodiments 1 to 8, wherein the arene precursor comprises a first halogen and a second halogen, wherein the second halogen is located on the precursor substantially opposite the first halogen, and wherein a first dehalogenation reaction takes place at the first halogen and a second dehalogenation reaction takes place at the second halogen.

10. The method according to any one of embodiments 1 to 9, wherein the aromatic polymer forms a covalent organic framework.

11. The method according to any one of embodiments 1 to 10, wherein the arene precursor is a trihaloarene; optionally, wherein the arene precursor is selected from the group of 1,3,5-trihalobenzene, 1,3,5-tris(4-halophenyl)benzene and a combination thereof.

12. The method according to any one of embodiments 1 to 11, where the arene precursor is a tetrahaloarene, optionally, where the arene precursor comprises a 1,3,6,8-tetrahalopyrene.

13. The method according to any one of embodiments 1 to 12, where the arene precursor is a dihaloarene or a trihaloarene, and wherein two or three halogens substitute respective hydrogens at positions of the same arene precursor so that their distance(s) between each other are the greatest.

14. The method according to any one of embodiments 1 to 13, where the reacting step d) further includes the step of forming the arene precursor into a halogenated radical as an intermediate to further form the chemical composition.

15. The method according to any one of embodiments 1 to 14, where the arene precursor includes at least two different arene precursors.

16. The method according to any one of embodiments 1 to 15, where the step b) of providing the arene precursor further includes the step of adding the arene precursor into the cathodic region, where the cathodic region is separate from the anodic region.

17. The method according to any one of embodiments 1 to 16, where the reacting step d) further includes the step of simultaneously polymerizing the arene precursor to form the chemical composition and forming a film of the chemical composition on a surface of the cathodic electrode.

18. The method according to any one of embodiments 1 to 17, where the electrolyte is selected from the group of hexafluorophosphates, tetrafluoroborates, ammonium bromides, perchlorate, and a combination thereof, optionally the electrolyte is selected from the group of tetramethylammonium hexafluorophosphate (TMAPF6), tetraethylammonium hexafluorophosphate (TEAPF6), tetrabutylammonium hexafluorophosphate (TBAPF6), potassium hexafluorophosphate (KPF6), tetramethylammonium tetrafluoroborates (TMABF4), tetraethylammonium tetrafluoroborates (TEABF4), tetrabutylammonium tetrafluoroborates (TBABF4), potassium tetrafluoroborates (KBF4), lithium perchlorate (LiClO4), and a combination thereof.

19. The method according to any one of embodiments 1 to 18, where the solution further includes a solvent; optionally, wherein the solvent includes an anhydrous organic solvent; optionally, the solvent is selected from the group of acetone, acetonitrile, toluene, dichloromethane, chloroform, tetrahydrofuran, dimethylformamide, dimethyl sulfoxide, benzonitrile, and a combination thereof.

20. The method according to any one of embodiments 1 to 19, where the solvent comprises acetonitrile and toluene; optionally, where the ratio of acetonitrile to toluene is from about 8:1 to about 2:1; optionally the ratio of acetonitrile to toluene is about 4:1.

21. The method according to any one of embodiments 1 to 20, where the dehalogenation coupling reaction is conducted under constant voltage of from about 1.5V to about 3.5V for from about 2 hours to about 36 hours at a temperature of from about 0° C. to about 60° C.

22. The method according to any one of embodiments 1 to 21, where the electrolyte includes tetrabutylammonium hexafluorophosphate at a concentration of from about 0.05 mmol/mL to about 1 mmol/mL, and where the arene precursor concentration is from about 0.001 mmol/mL to about 0.5 mmol/mL.

23. The method according to any one of embodiments 1 to 22, further including, after the reacting step d) the step of adding a quenching agent for quenching of the reactions; optionally, the quenching agent is selected from the group of water, a salt solution and the solvent, and a combination thereof.

24. The method according to any one of embodiments 1 to 23, further including, after the reacting step d) the step of reversing positive and negative poles of the electrochemical potential for quenching of the reactions.

25. The method according to any one of embodiments 1 to 24, further including, after the reacting step d), the step of f) washing the composition with a washing agent selected from the group of water, ethanol, methanol, n-hexane, 2-dichlorobenzene, dichloromethane, 1,2-dichloroethane, tetrahydrofuran, heptane, ethyl acetate, toluene, acetonitrile, and a combination thereof;

26. The method according to any one of embodiments 1 to 25, where the method includes, after the reacting step d) the step of drying the chemical composition at a drying temperature of from about room temperature to about 250°

C.; or from about room temperature to about 70° C.; or from about 70° C. to about 150° C.; or from about 80° C. to about 100° C.; optionally where the drying step takes places under vacuum for a period of from about 1 hour to about 12 hours; or from about 1 hour to about 6 hours; or from about 1 hour to about 4 hours; or from about 6 hours to about 12 hours; or from about 8 hours to about 12 hours.

27. The method according to any one of embodiments 1 to 26, where the anodic electrode comprises a conductive substrate; preferably where the substrate includes an inert conductive metal selected from the group of platinum, titanium, an alloy thereof, and a combination thereof.

28. The method according to any one of embodiments 1 to 27, where the cathodic electrode comprises a conductive substrate selected from the group silicon, gold, platinum, stainless steel, an alloy thereof, and a combination thereof.

29. A polymer fabricated according to the method of any one of embodiments 1 to 28.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable subcombination.

All references specifically cited herein are hereby incorporated by reference in their entireties. However, the citation or incorporation of such a reference is not necessarily an admission as to its appropriateness, citability, and/or availability as prior art to/against the present invention.

REFERENCES

ADDIN ZOTERO_BIBL {"uncited":[ ], "omitted":[ ], "custom":[ ]}CSL_BIBLIOGRAPHY 1. Kong, J. et al. Long-term stable polymer solar cells with significantly reduced burn-in loss. Nat. Commun. 5, 5688 (2014).
2. Garg, S. & Goel, N. Optoelectronic applications of conjugated organic polymers: influence of donor/acceptor groups through density functional studies. J. Phys. Chem. C 126, 9313-9323 (2022).
3. Wu, X. et al. Wearable in-sensor reservoir computing using optoelectronic polymers with through-space charge-transport characteristics for multi-task learning. Nat. Commun. 14, 468 (2023).
4. Yin, J. et al. Programmable zigzag π-extension toward graphene-like molecules by the stacking of naphthalene blocks. Nat. Synth. (2023) doi:10.1038/s44160-023-00306-6.
5. Cheng, L. et al. Steering the topological defects in amorphous laser-induced graphene for direct nitrate-to-ammonia electroreduction. ACS Catal. 12, 11639-11650 (2022).
6. Cheng, Y, Yang, S. & Hsu, C. Synthesis of conjugated polymers for organic solar cell applications. Chem. Rev. 109, 5868-5923 (2009).
7. Ullmann, F. & Bielecki, J. Ueber synthesen in der biphenylreihe. Ber. Dtsch. Chem. Ges. 34, 2174-2185 (1901).
8. Zhou, D., Tan, X., Wu, H., Tian, L. & Li, M. Synthesis of C—C bonded two-dimensional conjugated covalent organic framework films by Suzuki polymerization on a liquid-liquid interface. Angew. Chem. Int. Ed. 131, 1390-1395 (2019).
9. Wang, D. & Li, M. In situ immobilization of palladium nanodots in C—C bonded 2D conjugated polymers through Suzuki polymerization at the liquid-liquid interface. Chem-Eur. J. 26, 6490-6494 (2020).
10. Li, C. et al. Two-dimensional conjugated polymer synthesized by interfacial Suzuki reaction: towards electronic device applications. Angew. Chem. Int. Ed. 59, 9403-9407 (2020).
11. Zhang, L. et al. Liquid/liquid interfacial Suzuki polymerization prepared novel triphenylamine-based conjugated polymer films with excellent electrochromic properties. ACS Appl. Mater. Interfaces 13, 20810-20820 (2021).
12. Matyjaszewski, K. Advanced materials by atom transfer radical polymerization. Adv. Mater. 30, 1706441 (2018).
13. Doyle, C. M. et al. Surface mediated synthesis of 2D covalent organic networks: 1,3,5-tris(4-bromophenyl) benzene on Au(111). Phys. Status Solidi B 256, 1800349 (2019).
14. Gutzler, R. et al. Surface mediated synthesis of 2D covalent organic frameworks: 1,3,5-tris(4-bromophenyl) benzene on graphite(001), Cu(111), and Ag(110). Chem. Commun. 29, 4456-4458 (2009).
15. Bai, B., Wang, D. & Wan, L. Synthesis of covalent organic framework films at interfaces. B. Chem. Soc. Jpn. 94, 1090-1098 (2021).
16. Grill, L. & Hecht, S. Covalent on-surface polymerization. Nat. Chem. 12, 115-130 (2020).
17. Lee, J. M. & Cooper, A. I. Advances in conjugated microporous polymers. Chem. Rev. 120, 2171-2214 (2020).
18. Chen, H. et al. Benzene ring knitting achieved by ambient-temperature dehalogenation via mechanochemical Ullmann-type reductive coupling. Adv. Mater. 33, 2008685 (2021).
19. Gnaim, S. et al. Cobalt-electrocatalytic HAT for functionalization of unsaturated C—C bonds. Nature 605, 687-695 (2022).
20. Tavakoli, E. et al. In situ bottom-up synthesis of porphyrin-based covalent organic frameworks. J. Am. Chem. Soc. 141, 19560-19564 (2019).
21. Shi, G., Jin, S., Xue, G. & Li, C. A conducting polymer film stronger than aluminum. Science 267, 994-996 (1995).
22. Wang, X., She, P. & Zhang, Q. Recent advances on electrochemical methods in fabricating two-dimensional organic-ligand-containing frameworks. SmartMat 2, 299-325 (2021).
23. Zhang, C., Li, Y, Li, H., Zhang, Q. & Lu, J. Overview of electric-field-induced deposition technology in fabricating organic thin films. J. Mater. Chem. C 9, 374-394 (2021).
24. Wiebe, A. et al. Electrifying organic synthesis. Angew. Chem. Int. Ed. 57, 5594-5619 (2018).
25. Kingston, C. et al. A Survival guide for the "electro-curious". Acc. Chem. Res. 53, 72-83 (2020).
26. Yan, M., Kawamata, Y & Baran, P. S. Synthetic organic electrochemical methods since 2000: on the verge of a renaissance. Chem. Rev. 117, 13230-13319 (2017).
27. Shi, G., Xue, G., Li, C., Jin, S. & Yu, B. Uniaxial oriented poly(p-phenylene) fibrils and films. Macromolecules 27, 3678-3679 (1994).

28. Abdulkarim, A. et al. A new solution to an old problem: synthesis of unsubstituted poly(para-phenylene). J. Am. Chem. Soc. 138, 16208-16211 (2016).
29. González-Tejera, M. J., de la Blanca, E. S. & Carrillo, I. Polyfuran conducting polymers: synthesis, properties, and applications. Synthetic Met. 158, 165-189 (2008).
30. Hamby, T. B., Lalama, M. J. & Sevov, C. S. Controlling Ni redox states by dynamic ligand exchange for electroreductive Csp3-Csp2 coupling. Science 376, 410-416 (2022).
31. Zhang, W. et al. Electrochemically driven cross-electrophile coupling of alkyl halides. Nature 604, 292-297 (2022).
32. Zhang, B. et al. Ni-electrocatalytic Csp3-Csp3 doubly decarboxylative coupling. Nature 606, 313-318 (2022).
33. Li, Z. et al. Electrochemically enabled, nickel-catalyzed dehydroxylative cross-coupling of alcohols with aryl halides. J. Am. Chem. Soc. 143, 3536-3543 (2021).
34. Jennings, P. W., Pillsbury, D. G., Hall, J. L. & Brice, V. T. Carbon-carbon bond formation via organometallic electrochemistry. J. Org. Chem. 41, 719-722 (1976).
35. Fox, M. A., Chandler, D. A. & Lee, C. Electrocatalytic coupling of aryl halides with (1,2-bis(di-2-propylphosphino)benzene)nickel(0). J. Org. Chem. 56, 3246-3255 (1991).
36. Amatore, C. et al. Oxidative addition of aryl halides to transient anionic à-aryl-palladium(0) intermediates—application to palladium-catalyzed reductive coupling of aryl halides. Chem-Eur. J. 2, 957-966 (1996).
37. Sengmany, S. et al. Preparation of functionalized aryl- and heteroarylpyridazines by nickel-catalyzed electrochemical cross-coupling reactions. J. Org. Chem. 72, 5631-5636 (2007).
38. Studer, A. & Curran, D. P. The electron is a catalyst. Nat. Chem. 6, 765-773 (2014).
39. Li, C., Shi, G., Liang, Y, Ye, W. & Sha, Z. High-quality poly(p-phenylene) film prepared by electrochemical polymerization of benzene at a stainless steel electrode. Polymer 38, 5023-5026 (1997).
40. Marucci, A. et al. Resonant raman study of polyparaphenylene-based carbons. J. Mater. Res. 14, 1124-1131 (1999).
41. Larkin, P. in Infrared and Raman Spectroscopy: Principles and Spectral interpretation Ch. 2 (Elsevier Press, 2011).
42. Gin, D. L., Conticello, V. P. & Grubbs, R. H. Stereoregular precursors to poly(p-phenylene) via transition-metal-catalyzed polymerization. 2. the effects of polymer stereochemistry and acid catalysts on precursor aromatization: a characterization study. J. Am. Chem. Soc. 116, 10934-10947 (1994).
43. Lian, F., Xu, K. & Zeng, C. The synergism of sequential paired electrosynthesis with halogen bonding activation for the cyclization of organochlorides with olefins. Sci. China Chem. 66, 540-547 (2023).
44. Huang, Z., Qu, L., Shi, G., Chen, F. & Hong, X. Electrochemical polymerization of naphthalene in the electrolyte of boron trifluoride diethyl etherate containing trifluoroacetic acid and polyethylene glycol oligomer. J. Electroanal. Chem. 556, 159-165 (2003).
45. Johnson, J. P. et al. Comparison of "polynaphthalenes" prepared by two mechanistically distinct routes. J. Am. Chem. Soc. 125, 14708-14709 (2003).
46. Fernandez, A. L., Granda, M., Bermejo, J. & Menendez, R. Catalytic polymerization of anthracene oil with aluminium trichloride. Carbon, 37, 1247-1255(1999).
47. Fan, B., Qu, L. & Shi, G. Electrochemical polymerization of anthracene in boron trifluoride diethyl etherate. J. Electroanal. Chem. 575, 287-292 (2005).
48. Vorona, M. Y et al. Developing and comparing 2,6-anthracene derivatives: optical, electrochemical, thermal, and their use in organic thin film transistors. Materials 13, 1961-1975 (2020).
49. Lin, K. et al. Electrosynthesis of electroactive and fluorescent polyphenanthrenes via electropolymerization in BmimPF6. Synthetic Met. 209, 447-454 (2015).
50. Nie, G., Han, X., Zhang, S. & Wei, Q. Electrosyntheses of high-quality polyphenanthrene in the electrolyte of boron trifluoride diethyl etherate containing trifluoroacetic acid. J. Polym. Sci. Pol. Chem. 45, 3929-3940 (2007).
51. Li, H. et al. Designing 7-conjugated polypyrene nanoflowers formed with meso- and microporous nanosheets for high-performance anode of potassium ion batteries. Chem. Eng. J. 430, 132704 (2022).
52. Lu, G. & Shi, G. Electrochemical polymerization of pyrene in the electrolyte of boron trifluoride diethyl etherate containing trifluoroacetic acid and polyethylene glycol oligomer. J. Electroanal. Chem. 586, 154-160 (2006).
53. Lu, G., Qu, L. & Shi, G. Electrochemical fabrication of neuron-type networks based on crystalline oligopyrene nanosheets. Electrochim. Acta 51, 340-346 (2005).
54. Ren, H. et al. Synthesis of a porous aromatic framework for adsorbing organic pollutants application. J. Mater. Chem. 21, 10348-10353 (2011).

We claim:

1. A method for fabricating a chemical composition comprising an aromatic polymer, comprising the steps of:
    a) providing an anodic region and a cathodic region;
    b) providing an arene precursor, wherein the arene precursor is selected from the group consisting of a phenyl halide, a halogenated polycyclic aromatic hydrocarbon, and a combination thereof, and wherein the arene precursor comprises more than one halogen;
    c) providing an electrochemical potential between the anodic region and the cathodic region;
    d) reacting the arene precursor under mild conditions with neither organometallic, metallic nor base catalyst via the electrochemical potential to form the chemical composition, wherein the reacting step d) further comprises the step of conducting a cathodic reaction.

2. The method according to claim 1, wherein the cathodic reaction further comprises the step of conducting a dehalogenation coupling reaction of the arene precursor to form the chemical composition.

3. The method according to claim 2, wherein the reacting step d) further comprises the step of forming the arene precursor into a halogenated radical as an intermediate to further form the chemical composition.

4. The method according to claim 2, wherein the dehalogenation coupling reaction is conducted under constant voltage of from about 1.5V to about 3.5V for from about 2 hours to about 36 hours at a temperature of from about 0° C. to about 60° C.

5. The method according to claim 4, wherein the electrolyte comprises tetrabutylammonium hexafluorophosphate at a concentration of from about 0.05 mmol/mL to about 1 mmol/mL, and wherein the arene precursor concentration is from about 0.001 mmol/mL to about 0.5 mmol/mL.

6. The method according to claim 1, wherein the method further comprising the step of providing an anodic electrode at the anodic region, a cathodic electrode at the cathodic region, and a solution comprising an electrolyte, wherein the anodic electrode and the cathodic electrode are at least partially contacting the solution.

7. The method according to claim 6, wherein the reacting step d) further comprises the step of simultaneously polymerizing the arene precursor to form the chemical composition and forming a film of the chemical composition on a surface of the cathodic electrode.

8. The method according to claim 6, wherein the electrolyte is selected from the group consisting of: hexafluorophosphates, tetrafluoroborates, ammonium bromides, perchlorate, and a combination thereof, optionally the electrolyte is selected from the group consisting of: tetramethylammonium hexafluorophosphate (TMAPF$_6$), tetraethylammonium hexafluorophosphate (TEAPF$_6$), tetrabutylammonium hexafluorophosphate (TBAPF$_6$), potassium hexafluorophosphate (KPF$_6$), tetramethylammonium tetrafluoroborates (TMABF$_4$), tetraethylammonium tetrafluoroborates (TEABF$_4$), tetrabutylammonium tetrafluoroborates (TBABF$_4$), potassium tetrafluoroborates (KBF$_4$), lithium perchlorate (LiClO$_4$), and a combination thereof.

9. The method according to claim 6, wherein the solution further comprises a solvent; optionally, wherein the solvent comprises an anhydrous organic solvent; optionally, the solvent is selected from the group consisting of: acetone, acetonitrile, toluene, dichloromethane, chloroform, tetrahydrofuran, dimethylformamide, dimethyl sulfoxide, benzonitrile, and a combination thereof.

10. The method according to claim 9, wherein the solvent comprises acetonitrile and toluene; optionally, wherein the ratio of acetonitrile to toluene is from about 8:1 to about 2:1; optionally the ratio of acetonitrile to toluene is about 4:1.

11. The method according to claim 6, wherein the anodic electrode comprises a conductive substrate; preferably wherein the substrate comprises an inert conductive metal selected from the group consisting of platinum, titanium, an alloy thereof, and a combination thereof.

12. The method according to claim 6, wherein the cathodic electrode comprises a conductive substrate selected from the group consisting of silicon, gold, platinum, stainless steel, an alloy thereof, and a combination thereof.

13. The method according to claim 1, wherein the aromatic polymer is a conjugated polymer; optionally, the aromatic polymer is an unsubstituted conjugated polymer.

14. The method according to claim 1, wherein the aromatic polymer takes a form selected from the group consisting of a dimeric form, an oligomeric form, a polymeric form, and a combination thereof.

15. The method according to claim 1, the halogen is selected from the group consisting of a fluorine, a chlorine, a bromine, an iodine, and a combination thereof, preferably, the halogen comprises a bromine or an iodine.

16. The method according to claim 1, wherein the arene precursor is a dihaloarene, optionally, the arene precursor is selected from the group consisting of: dihalobenzene, dihalonaphthalene, dihalobiphenyl, dihaloanthracene, dihalophenanthrene, dihalophenalene, dihalopyrene, diphenylbenzene, dihalonaphthacene, dihalotriphenylene, dihalochrysene, dihalobenzo[c]phenanthrene, dihalobenz[a]anthracene, and a combination thereof.

17. The method according to claim 16, wherein the arene precursor comprises a first halogen and a second halogen, wherein the second halogen is located on the precursor substantially opposite the first halogen, and wherein a first dehalogenation reaction takes place at the first halogen and a second dehalogenation reaction takes place at the second halogen.

18. The method according to claim 1, wherein the aromatic polymer forms a covalent organic framework.

19. The method according to claim 18, wherein the arene precursor is a trihaloarene; optionally, wherein the arene precursor is selected from the group consisting of: 1,3,5-trihalobenzene, 1,3,5-tris(4-halophenyl)benzene and a combination thereof.

20. The method according to claim 18, wherein the arene precursor is a tetrahaloarene, optionally, wherein the arene precursor comprises a 1,3,6,8-tetrahalopyrene.

21. The method according to claim 1, wherein the arene precursor is a dihaloarene or a trihaloarene, and wherein two or three halogens substitute respective hydrogens at positions of the same arene precursor so that their distance(s) between each other are the greatest.

22. The method according to claim 1, wherein the arene precursor comprises at least two different precursors.

23. The method according to claim 1, wherein the step b) of providing the arene precursor further comprises the step of adding the arene precursor into the cathodic region, wherein the cathodic region is separate from the anodic region.

24. The method according to claim 1, further comprising, after the reacting step d) the step of adding a quenching agent for quenching of the reactions; optionally, the quenching agent is selected from the group consisting of: water, a salt solution and the solvent, and a combination thereof.

25. The method according to claim 1, further comprising, after the reacting step d) the step of reversing positive and negative poles of the electrochemical potential for quenching of the reactions.

26. The method according to claim 1, further comprising, after the reacting step d), the step of f) washing the composition with a washing agent selected from the group consisting of water, ethanol, methanol, n-hexane, 2-dichlorobenzene, dichloromethane, 1,2-dichloroethane, tetrahydrofuran, heptane, ethyl acetate, toluene, acetonitrile, and a combination thereof.

27. The method according to claim 1, wherein the method comprises, after the reacting step d) the step of drying the chemical composition at a drying temperature of from about room temperature to about 250° C.; or from about room temperature to about 70° C.; or from about 70° C. to about 150° C.; or from about 80° C. to about 100° C.; optionally wherein the drying step takes places under vacuum for a period of from about 1 hour to about 12 hours; or from about 1 hour to about 6 hours; or from about 1 hour to about 4 hours; or from about 6 hours to about 12 hours; or from about 8 hours to about 12 hours.

* * * * *